(12) United States Patent
Noh et al.

(10) Patent No.: US 10,204,746 B2
(45) Date of Patent: Feb. 12, 2019

(54) SEPARATION MEMBRANE FOR SUPER CAPACITOR, SUPER CAPACITOR COMPRISING SAME, AND MANUFACTURING METHOD THEREFOR

(71) Applicant: AMOTECH CO., LTD., Incheon (KR)

(72) Inventors: Hyeong Tak Noh, Seoul (KR); Jong Gwan Kim, Gyeonggi-do (KR); Won Gil Choi, Gyeonggi-do (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 15/561,433

(22) PCT Filed: Mar. 26, 2015

(86) PCT No.: PCT/KR2015/002942
§ 371 (c)(1),
(2) Date: Sep. 25, 2017

(87) PCT Pub. No.: WO2016/153092
PCT Pub. Date: Sep. 29, 2016

(65) Prior Publication Data
US 2018/0122588 A1    May 3, 2018

(30) Foreign Application Priority Data

Mar. 25, 2015  (KR) .................. 10-2015-0041833
Mar. 25, 2015  (KR) .................. 10-2015-0041836
Mar. 25, 2015  (KR) .................. 10-2015-0041837

(51) Int. Cl.
*H01G 11/52* (2013.01)
*H01G 11/36* (2013.01)
(Continued)

(52) U.S. Cl.
CPC ............. *H01G 11/52* (2013.01); *H01G 11/36* (2013.01); *H01G 11/40* (2013.01); *H01G 11/78* (2013.01); *Y02E 60/13* (2013.01)

(58) Field of Classification Search
CPC ........ H01G 11/52; H01G 11/36; H01G 11/40; H01G 11/78
(Continued)

(56) References Cited

U.S. PATENT DOCUMENTS

2010/0195270 A1*  8/2010  Hayakawa .............. B32B 5/022
                                                                 361/502
2014/0340817 A1*  11/2014  Noh ....................... H01G 11/14
                                                                 361/502

FOREIGN PATENT DOCUMENTS

JP    2002-100528 A    4/2002
JP    2014-053152 A    3/2014
(Continued)

OTHER PUBLICATIONS

International Search Authority/KR, International Search Report dated Feb. 19, 2016 in International Patent Application No. PCT/KR2015/002942 (with English translation), 6 pages.

*Primary Examiner* — Michael P McFadden
(74) *Attorney, Agent, or Firm* — Masuvalley & Partners

(57) ABSTRACT

Provided is a super capacitor. The super capacitor, according to an exemplary embodiment of the present invention, comprises: an energy storage assembly in which a plurality of unit modules are stacked; a sealing member arranged to surround the side portion of the energy storage assembly; upper and lower plates respectively arranged on the upper and lower portions of the energy storage assembly; and a roll force compensation member, arranged between the upper and lower plates and the energy storage assembly, for preventing the center portion of the energy storage assembly from being convexly bent toward the upper and lower plates.

(Continued)

Accordingly, overall performance can be enhanced by reducing the thickness deviation for each position, and uniform power can be generated regardless of position by resolving imbalance in impregnation.

16 Claims, 22 Drawing Sheets

(51) Int. Cl.
  *H01G 11/40* (2013.01)
  *H01G 11/78* (2013.01)

(58) Field of Classification Search
  USPC .......................................................... 361/502
  See application file for complete search history.

(56) References Cited

FOREIGN PATENT DOCUMENTS

| | | |
|---|---|---|
| KR | 10-2003-0033100 A | 4/2003 |
| KR | 10-2013-0016610 A | 2/2013 |
| KR | 101304181 B1 | 8/2013 |
| KR | 10-2014-0112666 A | 9/2014 |
| KR | 10-2014-0122950 A | 10/2014 |
| KR | 10-2014-0136376 A | 11/2014 |
| KR | 101479755 B1 | 1/2015 |

\* cited by examiner

SEPARATION MEMBRANE FOR SUPER CAPACITOR, SUPER CAPACITOR COMPRISING SAME, AND MANUFACTURING METHOD THEREFOR

RELATED APPLICATIONS

This application is a U.S. National Phase application under 35 U.S.C. § 371 of International Patent Application No. PCT/KR2015/002942 filed Mar. 26, 2015, which claims priority to Korean Patent Application No. 10-2015-0041833 filed Mar. 25, 2015,Korean Patent Application No. 10-2015-0041836 filed Mar. 25, 2015 and Korean Patent Application No. 10-2015-0041837 filed Mar. 25, 2015, which are hereby expressly incorporated by reference in their entirety for all purposes.

TECHNICAL FIELD

The present disclosure relates to a super capacitor in which a plurality of unit modules are stacked to form an energy storage assembly, and more particularly, to a separation membrane for a super capacitor, a super capacitor including the same, and a method of manufacturing the same.

BACKGROUND ART

Since a super capacitor uses an electrostatic characteristic, the super capacitor can be charged and discharged almost infinitely and used semi-permanently in comparison to a battery which uses an electrochemical reaction. Also, since the super capacitor has a very high energy charge and discharge velocity, an output density thereof is several tens of times or more that of a battery which uses an electro-chemical reaction.

Due to such characteristics of the super capacitor, application fields thereof are gradually expanding throughout industry.

Specifically, in development fields of next generation environmentally friendly vehicles such as electric vehicles (EV), hybrid electric vehicles (HEV), fuel cell vehicles (FCV), or the like, super capacitor are increasingly used as energy buffers.

The super capacitors are used with batteries as auxiliary energy storage devices. That is, the super capacitors are in charge of instantaneous supply and absorption of energy and the batteries are in charge of average energy supply of vehicles, and thus overall efficiency of a vehicle system can be improved, and a lifetime of an energy storage system can be prolonged.

The super capacitors can be largely classified into an electric double-layer capacitor (EDLC) and a hybrid super capacitor which uses an electrochemical oxidation-reduction reaction.

While an electric double layer is generated on a surface of an EDLC to accumulate electric charges, an electric double layer is formed on a surface of an electrode material in a hybrid super capacitor to accumulate electric charges by an oxidation-reduction reaction, and thus the hybrid super capacitor has an advantage of accumulating relatively more energy.

As disclosed in Korean Unexamined Patent Application Publication No. 10-2013-0016610 (Feb. 18, 2013), in a storage module of a conventional capacitor, a plurality of unit modules including a positive electrode, a negative electrode, and a separation membrane are stacked to form an energy storage assembly, a pair of end plates are disposed at outermost sides of the energy storage assembly, and the energy storage assembly is fixed through coupling beams disposed along edges of the end plates.

In the conventional storage module, when the energy storage assembly is fixed through the pair of end plates and the coupling beams, the coupling beams are concentrated on outer edges of the end plates such that a roll force is more severely generated toward the edges in which the coupling beams are located than at a central portion thereof.

Due to a difference between the roll forces, the energy storage assembly disposed inside the capacitor has a problem in that the center portion thereof is bent in a convex shape (a.k.a., a top phenomenon). This problem results in an imbalance in a distance between electrodes stacked in a vertical direction and causes degraded performance.

In addition, when an electrolytic solution is filled inside the capacitor, bubbles generated upon impregnation of the electrolytic solution are concentrated toward the center portion, which has a relatively low pressure, due to the difference between the roll forces according to position and air pockets are formed such that the air pockets act as factors that hinder impregnation of the positive electrode and the negative electrode with the electrolyte solution.

Accordingly, an imbalance in impregnation between the electrodes is caused and a difference in power generation between the electrodes is generated such that there is a problem in that heat generation and aging proceed rapidly.

Since secondary batteries used in the EDLC should operate within a relatively high temperature range and a temperature thereof is increased when the secondary batteries are continuously used in a high speed charge and discharge state, separation membranes used in the secondary batteries are required to have higher heat resistance and thermal stability than those required for a normal separation membrane. Also, the secondary batteries should have excellent battery characteristics such as rapid charging and discharging, high ion conductivity capable of corresponding to a low temperature, and the like.

In this case, the separation membrane is located between the positive electrode and the negative electrode of the battery to insulate the positive electrode from the negative electrode, and provides a path for ion conduction by maintaining the electrolytic solution. In order to block a current when a temperature of the battery becomes excessively high, the separation membrane has a function in which a portion of the separation membrane is melted to block a pore.

When the temperature of the battery is further increased and the separation membrane is melted, a large hole is generated and a short circuit occurs between the positive electrode and the negative electrode. This temperature is called a short circuit temperature, and the separation membrane should generally have a higher short circuit temperature than a low shutdown temperature thereof.

Conventionally, a cellulose-based separation membrane is mainly used as the separation membrane used in the EDLC. However, when the cellulose-based separation membrane is impregnated with the electrolytic solution having fluidity, the cellulose-based separation membrane tends to easily release the permeated electrolytic solution without maintaining the penetrated electrolyte solution.

Accordingly, in the case in which a plurality of unit modules including a positive electrode, a negative electrode, and a separation membrane are stacked to form an energy storage assembly and an electrolytic solution having fluidity is injected thereinto to complete a capacitor, when the separation membrane fails to maintain the electrolytic solution and releases the electrolytic solution, the electrolytic solution is concentrated on a bottom layer relative to layer units due to fluidity.

This causes a problem in that when the plurality of unit modules are sequentially stacked, separation membranes included in unit modules located at a predetermined height or more do not sufficiently contain the electrolytic solution, and thus performance of the capacitor is degraded.

Meanwhile, in the storage module of the conventional capacitor, a plurality of unit modules including a positive electrode, a negative electrode, and a separation membrane are stacked to form an energy storage assembly, a pair of end plates are disposed at outermost sides of the energy storage assembly, and the energy storage assembly is fixed through coupling beams disposed along edges of the end plates.

In a conventional super capacitor, a current collector, a first electrode, a separation membrane, a second electrode, and a current collector are sequentially and repeatedly stacked when assembled, and a process of bringing the members into close contact through a pressing process is repeatedly performed thereon to prevent generation of gaps between the members after the members are stacked.

As described above, in the conventional super capacitor, since the members are sequentially stacked in sheet units, there is a problem in that alignment between the members in the process of stacking the members is broken, and thus the performance thereof is degraded.

In addition, since a pressing process for bringing the members into close contact is repeatedly performed after the members are stacked, the pressing process is performed several tens to hundreds of times on members located at a lower side thereof and the members are deformed by an excessive roll force such that a thickness deviation with members located at an upper side thereof is generated.

The thickness deviation for each position or height has a problem of degrading the uniform performance.

DISCLOSURE

Technical Problem

An objective of the present disclosure is to provide a super capacitor capable of reducing a thickness deviation for each position by disposing a roll force compensation member between a plate and an energy storage assembly and by preventing a center portion of the energy storage assembly from being convexly bent by a deviation of roll forces according to a position.

Another objective of the present disclosure is to provide a super capacitor capable of smoothly discharging bubbles generated when an electrolytic solution is impregnated through a gap by forming an active material layer serving as a positive electrode or a negative electrode as a divided structure and disposing the active material layer to have the gap.

Still another objective of the present disclosure is to provide a separation membrane for a super capacitor capable of improving impregnation of a fluid electrolyte solution by stacking a nanofiber web layer containing a polyacrylonitrile nanofiber on a nonwoven fabric layer, and a super capacitor including the same.

Yet another objective of the present disclosure is to provide a method of manufacturing a super capacitor in which an energy storage assembly in which a plurality of unit modules are sequentially stacked is formed as a plurality of partition assemblies in which a predetermined number of unit modules are stacked, a plurality of partition assemblies are then stacked again thereon to complete the energy storage assembly, and a roll force applied to a lowermost unit module may be reduced.

Technical Solution

To achieve the above objective, one aspect of the present disclosure provides a super capacitor including an energy storage assembly in which a plurality of unit modules are stacked, a sealing member disposed to surround a side portion of the energy storage assembly, upper and lower plates disposed on upper and lower portions of the energy storage assembly, respectively, and a roll force compensation member disposed between each of the upper and lower plates and the energy storage assembly and configured to prevent convex bending of a center portion of the energy storage assembly toward the upper and lower plates.

Another aspect of the present disclosure provides a separation membrane for a super capacitor including a nonwoven fabric layer, and a nanofiber web layer containing a polyacrylonitrile nanofiber stacked on one surface or both surfaces of the nonwoven fabric layer.

Still another aspect of the present disclosure provides a super capacitor including an energy storage assembly in which a plurality of unit modules including a separation membrane are stacked, a sealing member disposed to surround a side portion of the energy storage assembly, and upper and lower plates disposed on upper and lower portions of the energy storage assembly, respectively.

In the super capacitor including the energy storage assembly in which the plurality of unit modules are stacked, each of the unit modules may include a separation membrane and active material layers stacked on both surfaces of the separation membrane, and the separation membrane may include a nonwoven fabric layer and a nanofiber web layer containing a polyacrylonitrile nanofiber stacked on one surface or both surfaces of the nonwoven fabric layer.

Yet another aspect of the present disclosure provides a method of manufacturing a super capacitor, wherein the method includes preparing a current collector and a plurality of units in which an active material layer is stacked on at least one surface of the current collector, forming a plurality of partition assemblies by repeatedly performing a process in which any one of the plurality of units is disposed, a sealing member is disposed to surround an edge of the current collector of the disposed unit, and another one of the plurality of units is stacked on the sealing member, and in a state in which a coupling beam having one end fixed to one of the upper plate and the lower plate is spaced apart along an edge of any one of the upper plate and the lower plate, sequentially stacking the plurality of partition assemblies between the upper plate and the lower plate via the coupling beam and completing an energy storage assembly.

Advantageous Effects

According to the present disclosure, a difference between roll forces according to position corresponding to a roll force concentrated on an outer portion is compensated through a roll force compensation member disposed between a plate and an energy storage assembly such that a center portion of the energy storage assembly is prevented from being convexly bent, and thus a thickness deviation for each position can be reduced and overall performance can be improved.

Also, according to the present disclosure, an active material layer serving as a positive electrode or a negative electrode is formed as a divided structure and is disposed to have a gap such that bubbles generated when an electrolytic solution is impregnated through the gap are smoothly discharged, and thus uniform power can be generated regardless of position by resolving an imbalance in the impregnation.

In addition, according to the present disclosure, a nanofiber web layer containing a polyacrylonitrile nanofiber is stacked on a nonwoven fabric layer to form a separation membrane and improve impregnation of a fluid electrolyte solution, and thus uniform power can be generated regardless of position by resolving an imbalance in the impregnation of the electrolytic solution according to the position.

Meanwhile, according to a manufacturing method of the present disclosure, an energy storage assembly in which a plurality of unit modules are sequentially stacked is formed as a plurality of partition assemblies in which a predetermined number of unit modules are stacked, a plurality of partition assemblies are then stacked again thereon to complete the energy storage assembly, and a roll force applied to a lowermost unit module is reduced, and thus a change of a structure of the unit module due to an excessive roll force can be prevented.

DESCRIPTION OF DRAWINGS

FIG. 3 includes schematic views illustrating unit modules constituting an energy storage assembly in a super capacitor according to one embodiment of the present disclosure, wherein

FIG. 7 includes views for describing a magnitude of a roll force for each position in a super capacitor according to one embodiment of the present disclosure, wherein FIG. 7A is a plan view illustrating positions at which coupling beams are fastened on upper and lower plates, FIG. 7B is a view illustrating a magnitude of a roll force for each position generated in an energy storage assembly due to the fastening positions of the coupling beams, and FIG. 7C is a view illustrating a state in which the energy storage assembly is deformed by the roll force for each position.

FIG. 11 includes schematic views illustrating different types of unit used in a method of manufacturing a super capacitor according to one embodiment of the present disclosure, wherein

FIG. 13 includes schematic views illustrating partition assemblies used in a method of manufacturing a super capacitor according to one embodiment of the present disclosure, wherein

FIG. 14 includes schematic views illustrating a stacking sequence of a second partition assembly used in a method of manufacturing a super capacitor according to one embodiment of the present disclosure, wherein

FIG. 15 includes views illustrating a sequence of a method of manufacturing a super capacitor according to one embodiment of the present disclosure, wherein

MODES OF THE INVENTION

Figure 1:
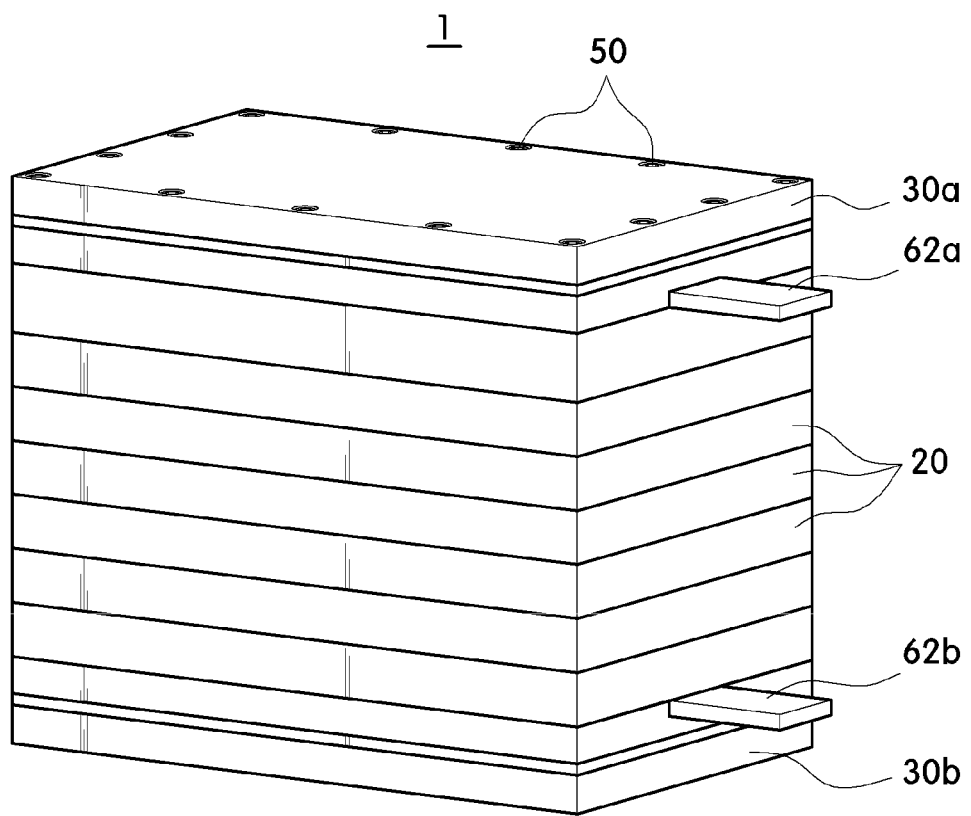
FIG. 1 is a view illustrating an exterior of a super capacitor according to one embodiment of the present disclosure.
Figure 2:
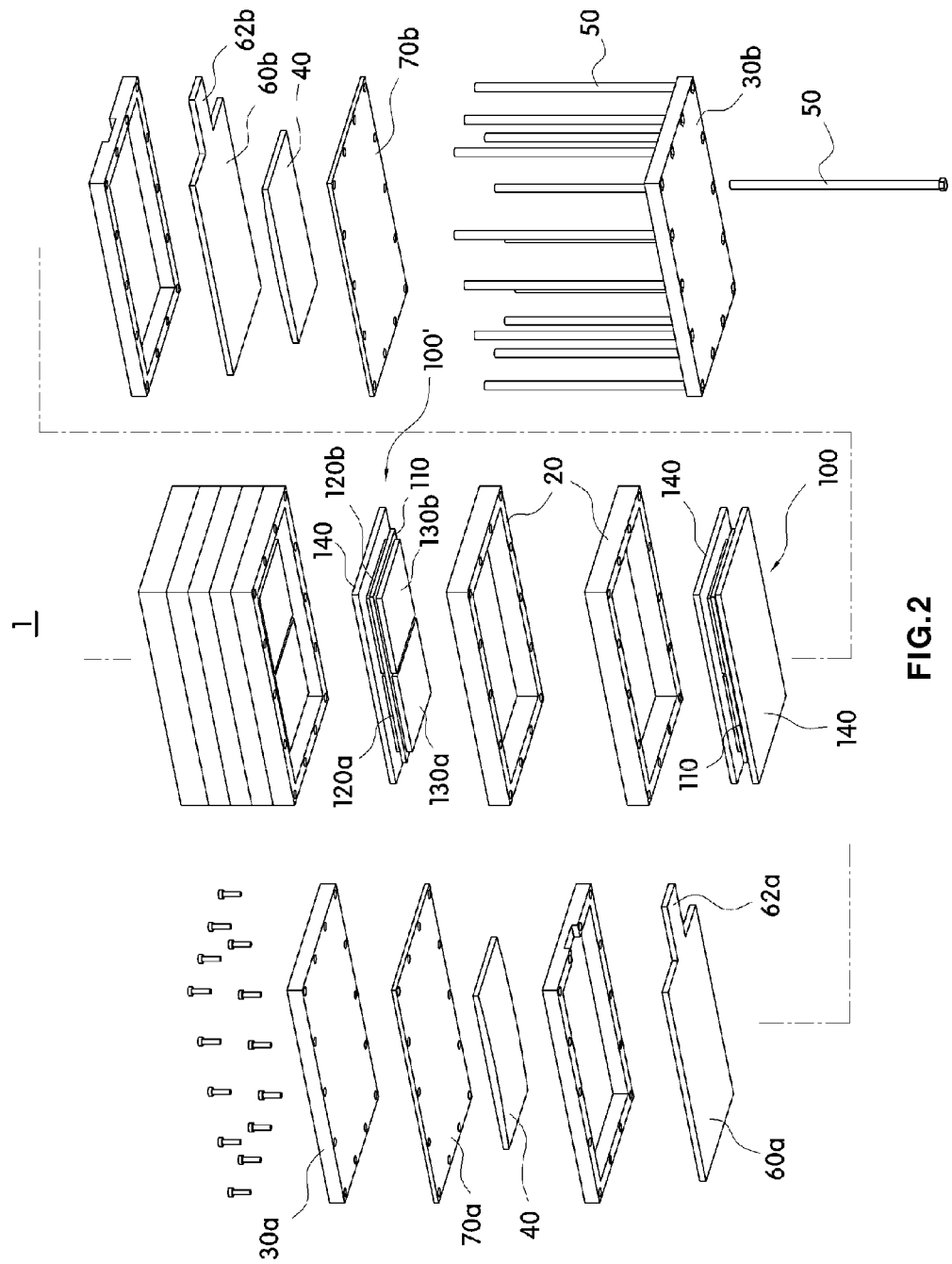
FIG. 2 is an exploded view of the super capacitor of FIG. 1.

Hereinafter, embodiments of the present disclosure that are easily performed by those skilled in the art will be described in detail with reference to the accompanying drawings. Embodiments of the present disclosure may be implemented in several different forms, and are not limited to the embodiments described herein. Parts irrelevant to description will be omitted in the drawings in order to clearly explain embodiments of the present disclosure. The same or similar parts will be denoted by the same reference numerals throughout this specification.

A super capacitor 1 according to one embodiment of the present disclosure includes an energy storage assembly 10, sealing members 20, upper and lower plates 30a and 30b, and roll force compensation members 40.

Figure 3A:
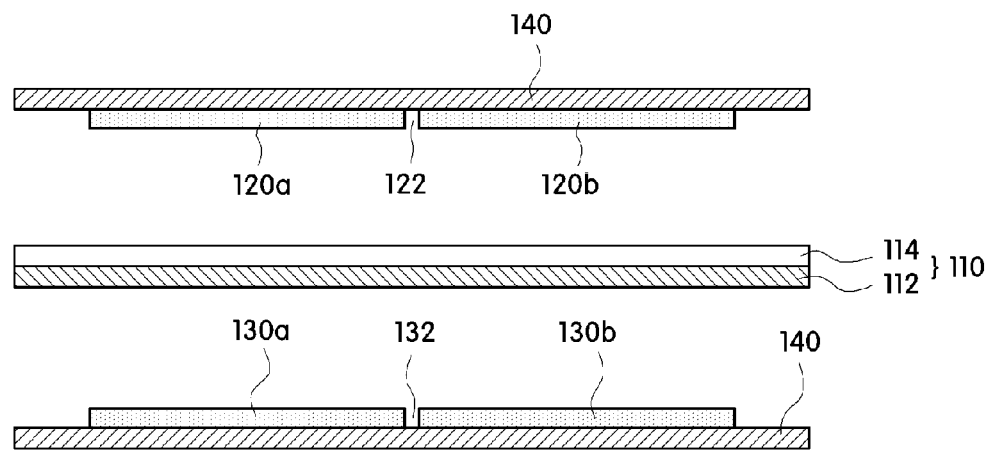
FIG. 3A is a schematic view illustrating a case in which a nanofiber web layer is stacked on one surface of a nonwoven fabric layer and FIG. 3B is a schematic view illustrating a case in which a nanofiber web layer is stacked on both surfaces of a nonwoven fabric layer.
Figure 3B:
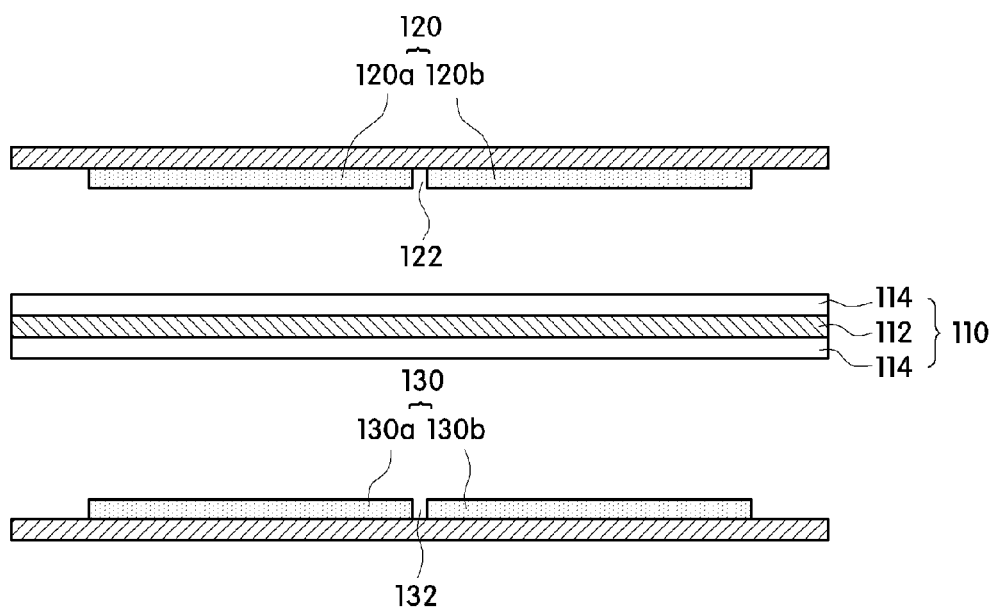
Figure 4:
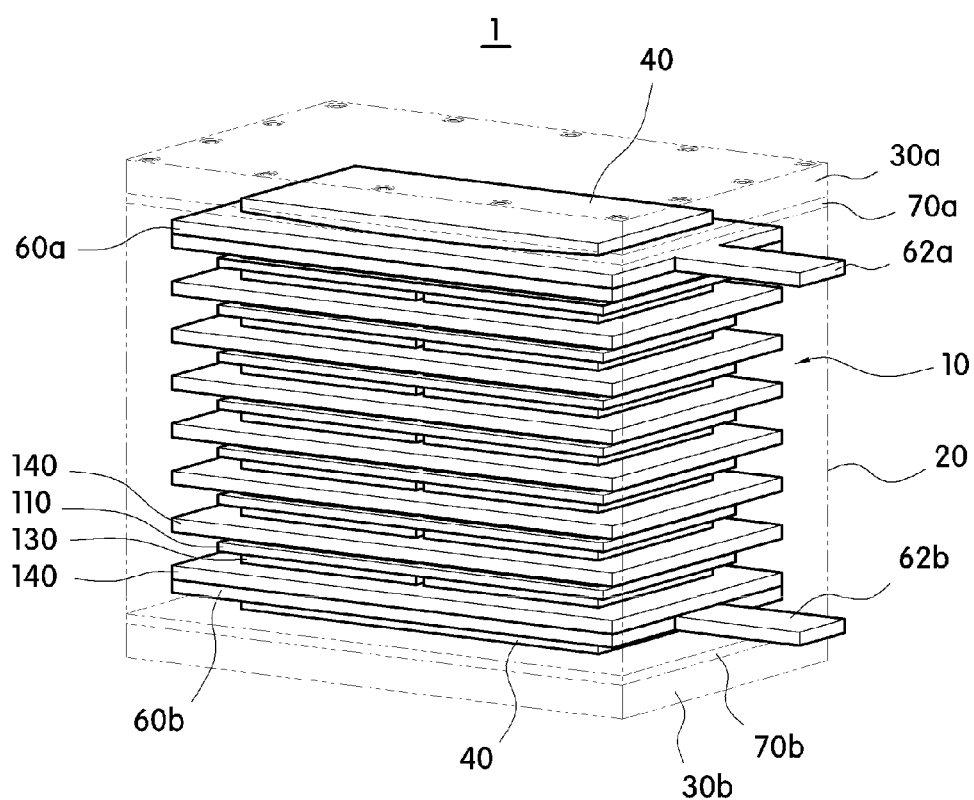
FIG. 4 is a view illustrating an energy storage assembly of FIG. 1.

The energy storage assembly 10 has a structure in which a plurality of unit modules 100 are stacked, as illustrated in FIG. 4. Each of the unit modules 100 includes a separation membrane 110, active material layers 120 and 130, and current collectors 140, as illustrated in FIG. 3.

That is, the unit module 100 has a structure in which the first active material layer 120 and the second active material layer 130 are disposed on both surfaces of the separation membrane 110, and the current collectors 140 are stacked on one side of the first active material layer 120 and one side of the second active material layer 130. Here, the current collectors 140, the first active material layer 120, the second active material layer 130, and the separation membrane 110 may be provided to have different sizes.

That is, the separation membrane 110 may be provided to have a greater size than the first active material layer 120 and the second active material layer 130, and the current collectors 140 may be provided to have a greater size than the separation membrane 110. However, the first active material layer 120 and the second active material layer 130, which are disposed on the both of the surfaces of the separation membrane 110, have the same size.

The first active material layer 120 and the second active material layer 130 may be provided to have an optimal thickness and size in a design process according to a purpose of use, and the separation membrane 110 may be formed to have a greater size than the first active material layer 120 and the second active material layer 130 to seal the first active material layer 120 and the second active material layer 130.

The current collectors 140 may have a greater size than the separation membrane 110 so that outer edges thereof may be supported by the sealing members 20 to support the unit modules 100.

The unit module 100 is implemented in the form in which the current collector 140, the second active material layer 130, the separation membrane 110, the first active material layer 120, and the current collector 140 are sequentially stacked.

A unit module 100' may be implemented in the form in which the second active material layer 130, the separation membrane 110, the first active material layer 120, and the current collector 140 are sequentially stacked, and may be stacked on one unit module 100 of the unit modules 100 disposed thereunder.

Accordingly, in the case in which the plurality of unit modules 100 and 100' are stacked to form the energy storage assembly 10, the energy storage assembly 10 is implemented in the form in which the current collector 140, the second active material layer 130, the separation membrane 110, the first active material layer 120, the current collector 140, the second active material layer 130, the separation membrane 110, the first active material layer 120, and the current collector 140 are sequentially and repeatedly stacked.

Here, the separation membrane 110 may be provided in the form in which two identical separation membranes are stacked. When two separation membranes are stacked in this way, a total area capable of absorbing the electrolytic solution may be increased such that an amount of the electrolytic solution absorbed into the separation membranes may be increased to improve overall performance.

The current collector 140 may be formed with a thin plate having a predetermined area, and may be made with a metal thin plate manufactured by copper, aluminum, stainless steel, nickel, titanium, chromium, manganese, iron, cobalt, zinc, molybdenum, tungsten, silver, gold, and combinations thereof. In addition, it should be noted that the current collector 140 may also be provided in the form of a mesh having a plurality of through-holes formed therein for efficiently performing ion movement and performing a uniform doping process.

The first active material layer 120 and the second active material layer 130 are respectively stacked on both of the surfaces of the separation membrane 110. Any one of the first active material layer 120 and the second active material layer 130 is a negative electrode active material layer, and the other one is a positive electrode active material layer. The first active material layer 120 and the second active material layer 130 may include activated carbon and a binder capable of reversibly doping and de-doping ions, and may include a conductive material composed of carbon black, a solvent, and the like.

That is, the separation membrane 110 is disposed on one surface of each of the first active material layer 120 and the second active material layer 130, and the current collector 140 is disposed on the other surface of each of the first active material layer 120 and the second active material layer 130 such that the first active material layer 120 and the second active material layer 130 together with the current collectors 140 form the positive electrode and the negative electrode and are separated from their opposite polarity via the separation membrane 110.

A method in which the first active material layer 120 and the second active material layer 130 are formed in a sheet form and are then each attached to one surface of the current collector 140 may be applied, and a method in which an active material, a conductive agent, a binder, an organic solvent, and the like are mixed to prepare a slurry and one surface of the current collector 140 is coated with the slurry may be applied.

In this case, the first active material layer 120 and the second active material layer 130 are provided as two pairs of plate members 120a and 120b and 130a and 130b having a predetermined area, respectively. The two pairs of plate members 120a and 120b and 130a and 130b are disposed between the separation membrane 110 and the current collector 140 to be spaced a predetermined distance from each other.

That is, gaps 122 and 132 having a predetermined size are formed between the two pairs of plate members 120a and 120b and 130a and 130b along a center line of the separation membrane 110 or the current collector 140.

Figure 5:
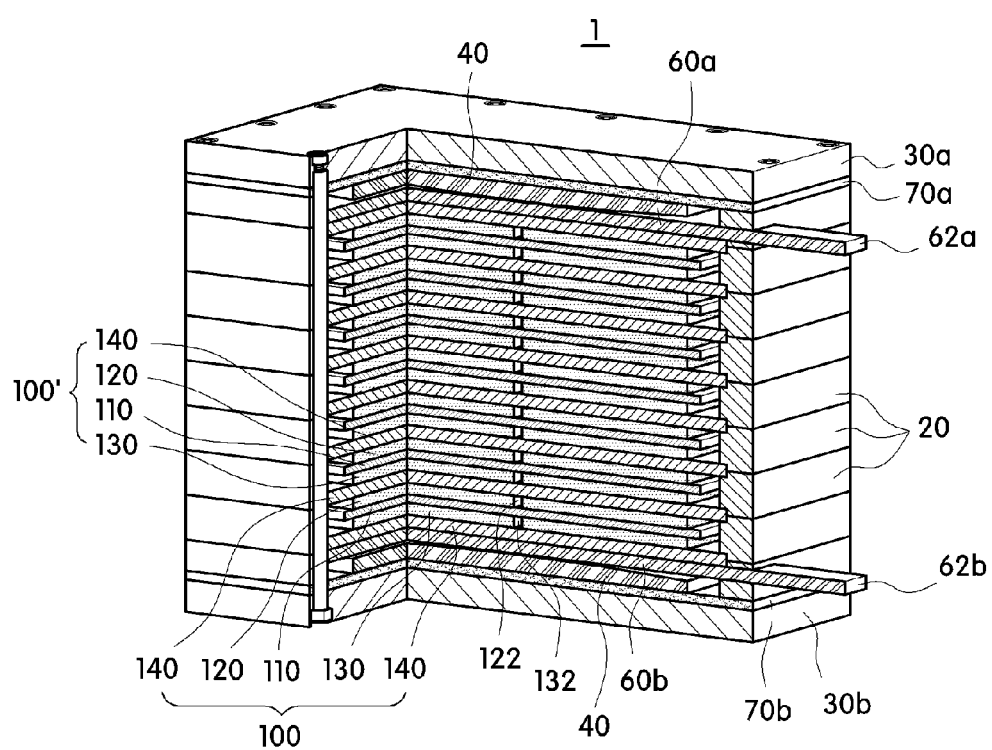
FIG. 5 is a partially cut view of the energy storage assembly of FIG. 1.

In this case, the gap 122 formed in the first active material layer 120 and the gap 132 formed in the second active material layer 130 may be formed in the same direction, as illustrated in FIG. 5, or may be formed to have different directions.

Figure 8:
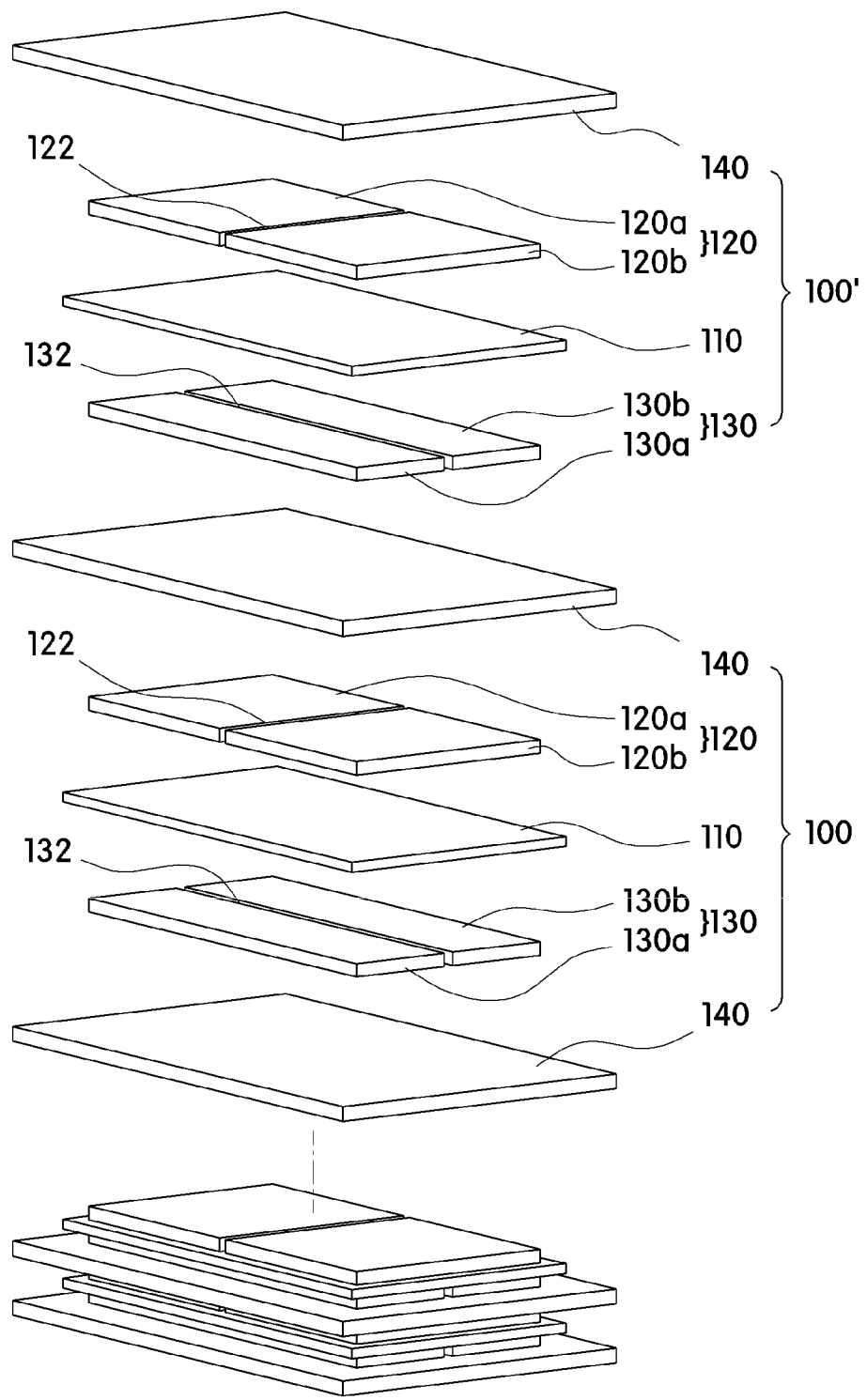
FIG. 8 is a view illustrating a different arrangement relationship between a gap formed in a first active material layer and a gap formed in a second active material layer in unit modules constituting the energy storage assembly of FIG. 1.

That is, as illustrated in FIG. 8, the gap 122 formed in the first active material layer 120 may be formed in a direction parallel to an X-axis direction, and the gap 132 formed in the second active material layer 130 may be formed in a direction parallel to a Y-axis direction.

The gaps 122 and 132 may serve as paths through which bubbles may move to improve discharge performance of bubbles even when bubbles are generated in a process of impregnating the active material layers 120 and 130 and the separation membrane 110 with the electrolytic solution after the assembly of the energy storage assembly 10 is completed.

In other words, when a relatively small roll force is applied to a center portion of the energy storage assembly 10 in comparison to a roll force applied to an edge of the energy storage assembly 10, the bubbles generated in the process of impregnating the first active material layer 120 and the second active material layer 130 with the electrolytic solution are concentrated toward the center portion in which the relatively small roll force is generated.

Accordingly, the bubbles concentrated in the center portion form air pockets that hinder movement of the electrolytic solution such that uniform impregnation of the active material layers 120 and 130 and the separation membrane 110 with the electrolytic solution is prevented.

This causes a problem in that a power difference according to an electrode position due to an imbalance in impregnation is generated, and heat generation and aging due to the imbalance in impregnation proceed rapidly.

In the present disclosure, since the gaps 122 and 132, which serve as moving paths of bubbles, are formed in center portions of the first active material layer 120 and the second active material layer 130, bubbles may be smoothly discharged through the gaps 122 and 13 to prevent the generation of a power difference according to an electrode position due to an imbalance in impregnation even when the bubbles generated in the process of impregnating of the electrolytic solution are concentrated toward the center portion due to an increase of an internal pressure or due to a relative difference between roll forces caused by structural causes.

Meanwhile, as illustrated in FIG. 3, the separation membrane 110 may include a nonwoven fabric layer 112 and a nanofiber web layer 114 stacked on one surface or both surfaces of the nonwoven fabric layer 112. Here, the nanofiber web layer 114 may be a nanofiber containing at least one selected from a group consisting of a polyacrylonitrile nanofiber and a polyvinylidene fluoride nanofiber.

Preferably, the nanofiber web layer 114 may be formed with only a polyacrylonitrile nanofiber to ensure formation of radioactive and uniform pores during the formation of the nanofiber web layer 114. An average diameter of the polyacrylonitrile nanofiber of the nanofiber web layer 114 may range from 0.1 to 2 μm, and preferably, from 0.1 to 1.0 μm.

This is because the separation membrane may not ensure sufficient heat resistance when the average diameter of the nanofiber is less than 0.1 μm, and mechanical strength of the separation membrane may be excellent but elasticity of the separation membrane may be reduced when the average diameter of the nanofiber is more than 2 μm.

At least one selected from a group consisting of cellulose, cellulose acetate, polyvinyl alcohol (PVA), polysulfone, polyimide, polyetherimide, polyamide, polyethylene oxide (PEO), polyethylene (PE), polypropylene (PP), polyethylene terephthalate (PET), polyurethane (PU), poly methylmethacrylate (PMMA), and polyacrylonitrile may be used as the nonwoven fabric constituting the nonwoven fabric layer 112

Here, the nonwoven fabric layer 112 may further include an inorganic additive agent, and the inorganic additive agent may include at least one selected from a group consisting of $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SiO_2$, $Al_2O_3$, and polytetrafluoroethylene (PTFE).

An average particle size of inorganic particles serving as the inorganic additive agent may range from 10 to 50 nm, preferably, from 10 to 30 nm, and more preferably, from 10 to 20 nm. In addition, an average thickness of the separation membranes may range from 10 to 121 μm, and preferably, from 10 to 50 μm.

Accordingly, since the separation membrane is too thin to ensure long-term durability when the average thickness of the separation membrane is less than 10 μm and it is difficult for the separation membrane to be thin when the average thickness of the separation membrane is more than 121 μm, it is preferable for the separation membrane to have an average thickness within the above ranges.

The nonwoven fabric layer 112 has an average thickness of 10 to 30 μm, and preferably, of 15 to 30 μm, and the nanofiber web layer preferably has an average thickness of 1 to 5 μm. In this case, when the average thickness of the separation membrane 110 ranges from 10 to 30 μm, an air permeability thereof may range from 0 to 10 cfm. Also, air porosity of the separation membrane 110 may range from 30 to 50%.

In the separation membrane 110, the nanofiber web layer 114 may be formed on one surface or both of the surfaces of the nonwoven fabric layer 112 through general electrospinning, air electrospinning (AES), electrospray, electro brown spinning, centrifugal electrospinning, flash electrospinning, or the like, and preferably, may be formed through AES.

As described above, since the separation membrane 110 used in the present disclosure includes the nonwoven fabric layer 112 and the nanofiber web layer 114 stacked on one surface or both of the surfaces of the nonwoven fabric layer 112 and the nanofiber web layer 114 is made with a nanofiber containing at least one selected from a group consisting of a polyacrylonitrile nanofiber and a polyvinylidene fluoride nanofiber, it is possible to prevent the release of the electrolytic solution to the outside after the impregnated electrolytic solution is contained.

Accordingly, when the plurality of unit modules 100 and 100' are stacked to form the energy storage assembly 10 and the electrolytic solution is injected to form the super capacitor 1, release of an electrolytic solution having fluidity that is impregnated into the separation membrane to the outside is prevented by the nanofiber web layer 114.

Therefore, the impregnation of the separation membrane 110 is increased and the electrolytic solution may sufficiently penetrate into the separation membrane 110 regardless of a stacking position of the separation membrane 110. Accordingly, the electrolytic solution may be uniformly distributed to all of the separation membranes 110, power may be uniformly generated for each position regardless of the stacking position to improve performance of the capacitor, and thus the rapid advance of heat generation and aging due to an imbalance in impregnation of the electrolytic solution may be prevented.

The sealing member 20 is disposed to surround side portions of the energy storage assembly 10, and prevents leakage of the electrolytic solution and an electrical short circuit. The sealing member 20 is provided in a hollow shape and has an inner surface disposed to be in contact with an edge of the current collector 140.

The sealing member 20 may be made with a single member, but may be provided in the form in which a plurality of members are stacked to facilitate staking of the unit modules 100. That is, the sealing member 20 is provided in a hollow shape to surround the edge of the current collector 140, and the plurality of sealing members 20 are stacked in a vertical direction. In this case, the sealing member 20 is disposed so that one side thereof comes into contact with the edge of the current collector 140.

In other words, each of the sealing members 20 may be disposed to protrude by a predetermined length between a pair of current collectors 140 whose inner edges face each other. Accordingly, a protruding portion is disposed between the pair of current collectors 140 stacked in the vertical direction such that the unit modules 100 are integrated.

In addition, the sealing members 20 are integrated with the upper and lower plates 30a and 30b, which are disposed at an upper end and a lower end of the energy storage assembly 10, via one coupling beam 50, and seal the side portions of the energy storage assembly 10.

Here, the coupling beam 50 may be formed with a material such as a ceramic material, an insulating metal, or a polymer having chemical resistance, and a plurality of coupling beams 50 are disposed along an edge of the sealing member 20.

In this case, each of the sealing members 20 includes fastening holes 22 formed such that the coupling beams 50 pass therethrough in a height direction. Accordingly, the coupling beam 50 is installed to pass through each of the fastening holes 22, and a lower end thereof is fixed to the lower plate 30b while an upper end thereof is fixed to the upper plate 30a. Therefore, the sealing member 20 and the upper and lower plates 30a and 30b are integrated via the coupling beams 50 to serve as a case which supports the unit modules 100 stacked in a plurality and accommodate the energy storage assembly 10 therein.

Here, the upper plate 30a comes into close contact with an upper surface of the energy storage assembly 100 in which the positive electrode of the energy storage assembly 100 is disposed at an outermost side, and the lower plate 30b comes into close contact with a lower surface of the energy storage assembly 100 in which the negative electrode of the energy storage assembly 100 is disposed at a lowermost side. Conversely, the positive electrode of the energy storage assembly 100 may be disposed to come into contact with the lower plate 30b while the negative electrode of the energy storage assembly 100 may be disposed to come into contact with the upper plate 30a.

In this case, the upper and lower plates 30a and 30b disposed at the upper and lower portions of the energy storage assembly 10 are provided to have the same area as or a greater area than an area obtained by summing areas of the sealing member 20 and the current collectors 140 so that the upper and lower plates 30a and 30b may press the sealing members 20 disposed on the side portions of the energy storage assembly 10 when fixed via the coupling beams 50. Accordingly, even when a plurality of sealing members 20 are provided and stacked in the vertical direction, the plurality of sealing members 20 may be pressed by the upper and lower plates 30a and 30b such that leakage of the electrolytic solution through connected portions may be prevented.

Meanwhile, a pair of corresponding electrode plates 60a and 60b are disposed between an uppermost surface of the energy storage assembly 10 and the upper plate 30a and between a lowermost surface of the energy storage assembly 10 and the lower plate 30b, respectively. Portions of the pair of electrode plates 60a and 60b protrude outward from the electrode plates 60a and 60b to be exposed to the outside of the sealing members 20, which are disposed on the side portions of the energy storage assembly 10, and be implemented as protruding terminals 62a and 62b.

Here, one of the pair of electrode plates 60a and 60b serves as a negative electrode terminal and the other one serves as a positive electrode terminal.

In this case, insulating layers 70a and 70b may be respectively provided between the electrode plate 60a and the upper plate 30a and between the electrode plate 60b and the lower plate 30b to prevent an electrical short circuit. Here, the insulating layers 70a and 70b may be made with the same material as the sealing members 20 disposed on the side portions of the energy storage assembly 10 to prevent an electrical short circuit and prevent leakage of the electrolytic solution through a gap between the electrode plate 60a and the upper plate 30a and a gap between the electrode plate 60b and the lower plate 30b.

Meanwhile, the roll force compensation members 40 for preventing convex bending of the center portion of the energy storage assembly 10 toward the upper and lower plates 30a and 30b may be disposed between the upper and lower plates 30a and 30b and the energy storage assembly 10.

Figure 6:
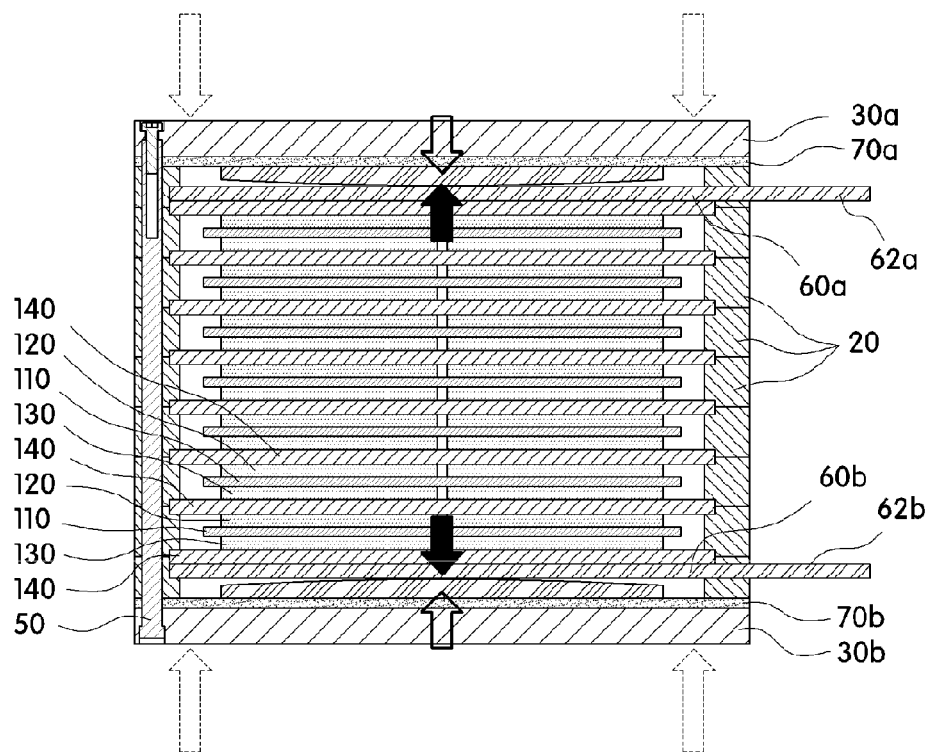
FIG. 6 is a longitudinal sectional view of FIG. 1, and schematically illustrates roll forces according to position.
Figure 7:
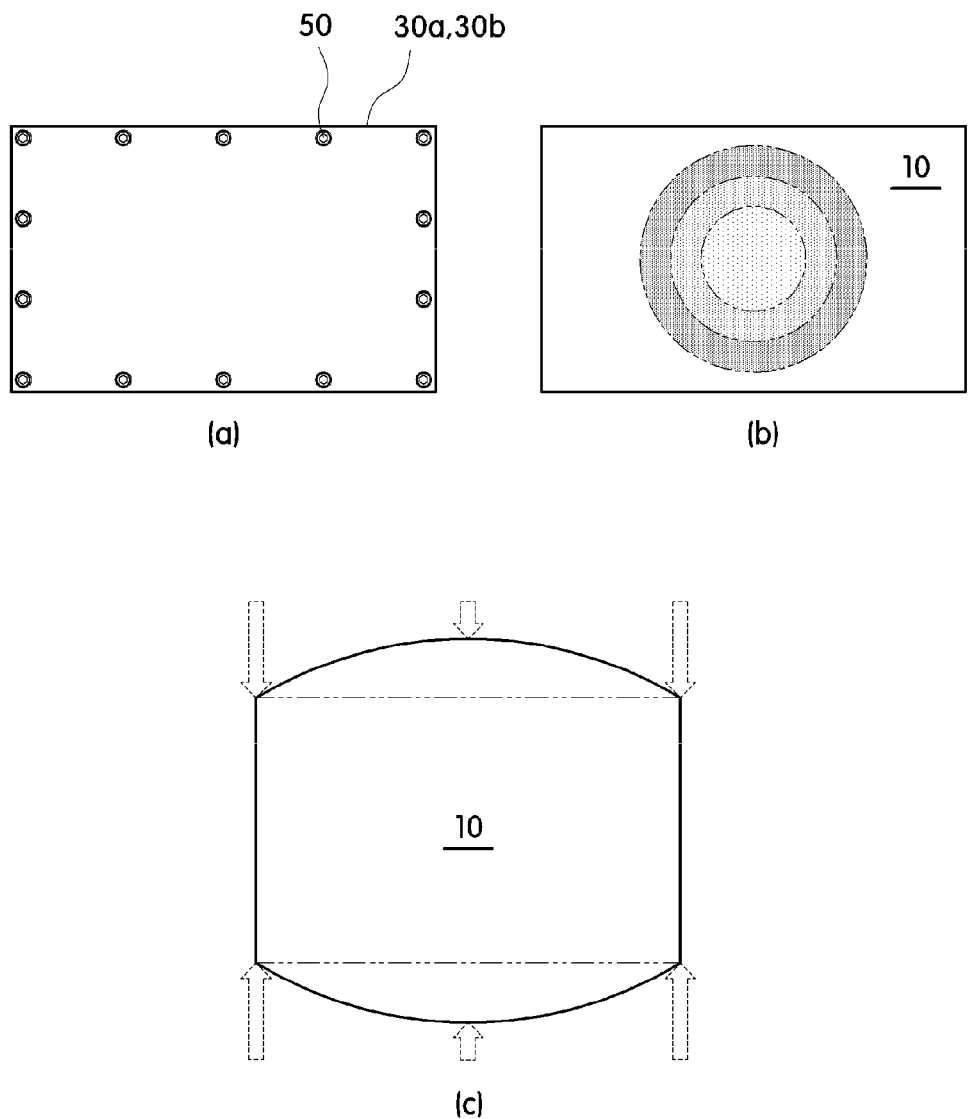

When the sealing members 20 and the upper and lower plates 30a and 30b are fixed via the coupling beams 50 disposed in circumferential directions of the sealing members 20, the coupling beams 50 are disposed on the edge of the energy storage assembly 10 such that the edge of the energy storage assembly 10, that is, the outer side thereof, receives a relatively large roll force while the center portion of the energy storage assembly 10 receives a small roll force due to a fastening force (see FIGS. 6 and 7). This is because when the energy storage assembly 10 is impregnated with the electrolytic solution, a relatively large roll force is more strongly generated through volume expansion due to the impregnation of the electrolytic solution.

In FIG. 7B, a central region represents a region having a relatively smallest roll force, and a roll force of a region increases as a color of the region darkens in relation to the central region. That is, due to a difference between roll forces according to position, a top phenomenon in which the center portion is convexly deformed occurs in the energy storage assembly 10. Therefore, since the stacked layers are bent together to form the energy storage assembly 10, an imbalance in a distance between the upper and the lower electrodes occurs, which causes the degradation of performance.

In the present disclosure, the roll force compensation members 40 are disposed on the central regions of the upper and lower plates to prevent deformation of the energy storage assembly 10 caused by the difference between the roll forces according to position.

Accordingly, since the roll force compensation members 40 are disposed on the center portions of the energy storage assembly 10 in which a relatively small roll force is generated, a deviation between the center portion and the outer portion of the energy storage assembly 10 is reduced by compensating the roll force of the center portion of the energy storage assembly 10 such that the top phenomenon in which the center portion of the energy storage assembly 10 is convexly bent may be prevented. Therefore, the imbalance of the distance between the upper and lower electrodes constituting the energy storage assembly 10 may be minimized and thus overall performance may be improved.

The roll force compensation members 40 may be provided to have a circular cross section, a polygonal cross section including a rectangular cross section, and a combination of cross sections. For example, the roll force compensation members 40 may be provided to have a cylindrical shape, a polygonal columnar shape, or a combination thereof having a predetermined area and height.

In this case, the roll force compensation members 40 may be disposed on central regions including center points of the upper and lower plates 30a and 30b, and may be disposed between the insulating layers 70 and the electrode plates 60a and 60b. In addition, the roll force compensation members 40 may be provided to have a smaller sectional area than that of each of the active material layers 120 and 130 provided in the energy storage assembly 10 such that damage to edges of the active material layers 120 and 130 due to an increase of roll forces provided via the roll force compensation members 40 may be prevented in advance.

Figure 9:
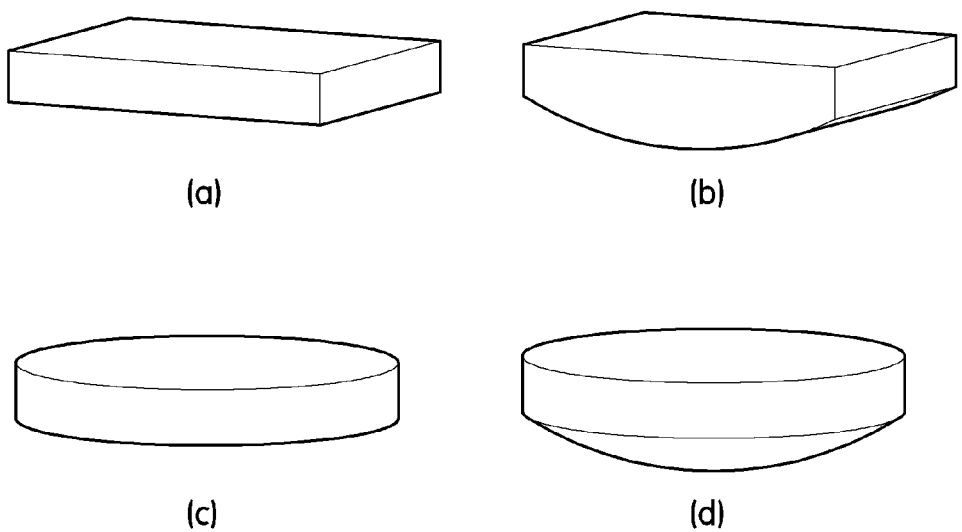
FIG. 9 includes views illustrating various forms of a roll force compensation member in a super capacitor according to one embodiment of the present disclosure.

The roll force compensation members 40 may be provided to have an entirely uniform height or thickness, as illustrated in FIGS. 9A and 9C, and may be provided to have a reduced height toward an outer portion thereof with respect to a center point thereof, as illustrated in FIGS. 9B and 9D.

Here, one surface of the roll force compensation member 40 in contact with each of the insulating layers 70a and 70b is provided to have a horizontal plane, and the other surface of the roll force compensation member 40 in contact with each of the electrode plates 60a and 60b is formed as a curved surface such that a sectional area of the roll force compensation member 40 is gradually decreased toward an outer side thereof with respect to the center point. This is for providing an entirely uniform roll force by compensating for a relatively largest roll force at the center portion having the relatively smallest roll force.

Meanwhile, the separation membrane 110 for a super capacitor according to the present disclosure is not limited to the above-described structure of the super capacitor 1. That is, it should be noted that any separation membrane may be used for capacitors having various structures as long as a separation membrane for separating a positive electrode from a negative electrode is used and an electrolytic solution having fluidity is injected into the separation membrane.

In addition, the separation membrane for a super capacitor according to the present disclosure may be applied to a lithium ion polymer battery and a secondary battery including a pseudo capacitor as well as a lithium ion secondary battery.

Hereinafter, a method of manufacturing a super capacitor according to one embodiment of the present disclosure will be described.

The method of manufacturing a super capacitor according to one embodiment of the present disclosure includes preparing units 200, 200', and 200", forming partition assemblies 11, 12, and 13 using the units 200, 200', and 200", and completing the energy storage assembly 10 through the partition assemblies 11, 12, and 13.

The units 200, 200', and 200" are minimum units constituting the final energy storage assembly 10, and the plurality of units 200, 200', and 200" are sequentially stacked to form the energy storage assembly 10.

Figure 10:
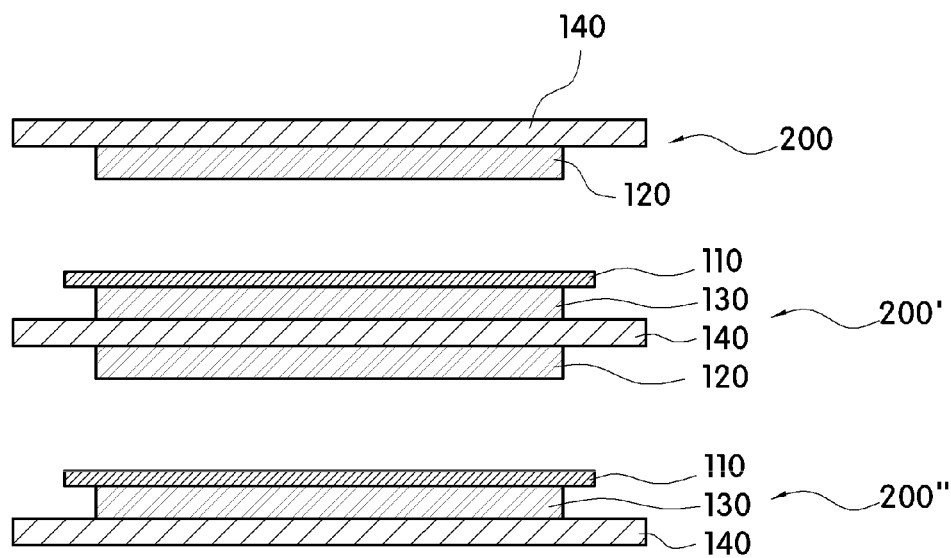
FIG. 10 is a schematic view illustrating units used in a method of manufacturing a super capacitor according to one embodiment of the present disclosure.

Each of the units 200, 200', and 200" is implemented in the form in which each of the active material layers 120 and 130 is stacked on at least one surface of each of the current collectors 140, as illustrated in FIG. 10.

Specifically, the units 200, 200', and 200" include a first unit 200 in which the active material layer 120 or 130 is stacked on one surface of the current collector 140, a second unit 200' in which a pair of active material layers 120 and 130 are stacked on both surfaces of the current collector 140 and the separation membrane 110 is stacked on one surface of any one of the pair of active material layers 120 and 130, and a third unit 200" in which the active material layer 120 or 130 and the separation membrane 110 are sequentially stacked on one surface of the current collector 140.

Figure 11A:
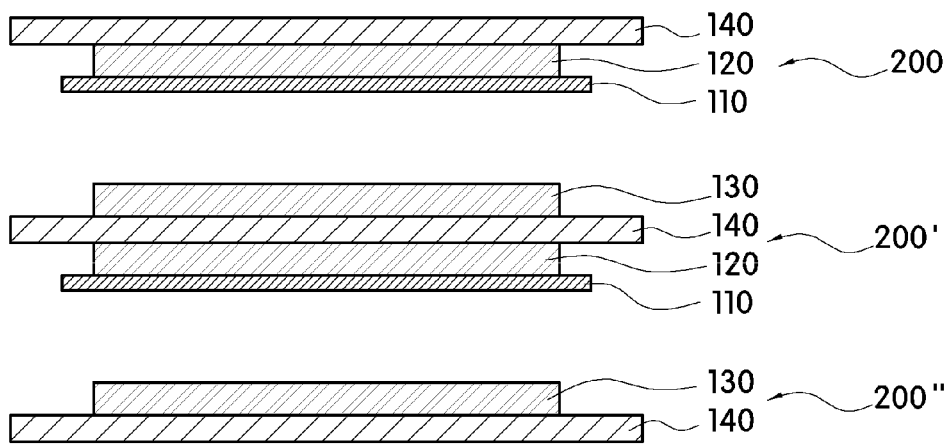
FIG. 11A is a schematic view illustrating a case in which stacked positions of separation membranes are different and FIG. 11B is a schematic view illustrating a case in which active material layers are made with two members.

Here, the above-described unit module may be configured by appropriately combining different units. For example, a unit module in the same form as the above-described unit module 100 is implemented by stacking the first unit 200 on the third unit 200". In addition, the separation membrane 110 is described as being included in the third unit 200" and the second unit 200', but the present disclosure is not limited thereto, and it should be noted that the units 200, 200', and 200" may be implemented in the form in which the separation membrane 110 is included in the first unit 200 and the second unit 200', as illustrated in FIG. 11A.

That is, when the first unit 200, the second unit 200', and the third unit 200" are sequentially stacked, a structure in which the current collector 140, the active material layer 130, the separation membrane 110, the active material layer 120, the current collector 140, the active material layer 130, the separation membrane 110, the active material layer 120, and the current collector 140 are continuously and repeatedly stacked is formed.

Here, the active material layers 120 and 130 include the first active material layer 120 and the second active material layer 130. An active material layer included in the third unit 200" is the first active material layer 120, an active material layer of the first unit 200 is the second active material layer 130, and a pair of active material layers 120 and 130 stacked on both surfaces of the current collector 140 in the second unit 200' are the first active material layer 120 and the second active material layer 130.

Accordingly, when the first unit 200, the second unit 200', and the third unit 200" are sequentially stacked, a structure in which the current collector 140, the first active material layer 120, the separation membrane 110, the second active material layer 130, the current collector 140, the first active material layer 120, the separation membrane 110, the second active material layer 130, and the current collector 140 are continuously and repeatedly stacked, and the first active material layer 120 and the second active material layer 130 are alternately disposed is formed.

Figure 12:
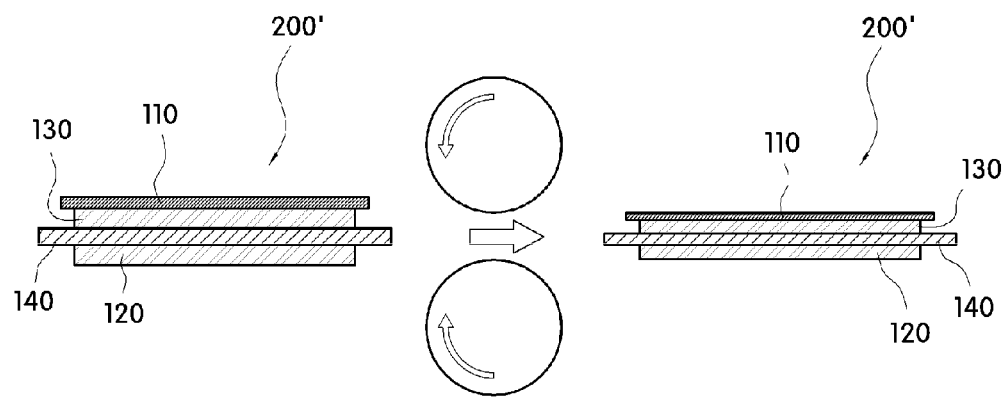
FIG. 12 is a view illustrating a process state of a method of manufacturing each of units used in a method of manufacturing a super capacitor according to one embodiment of the present disclosure.

Each of the units 200, 200', and 200" is integrally formed by pressing through a roll pressing process in a state in which the members thereof are stacked as illustrated in FIG. 12. Accordingly, adhesion between the members constituting each of the units 200, 200', and 200" is improved through the roll pressing process such that generation of a gap is prevented between the members of each of the units 200, 200', and 200". Accordingly, it is possible to prevent a phenomenon in which resistance due to generation of a gap between the members is increased and prevent an increase in a distance between the members by a gap being generated between the members due to a variation of the roll force during charging and discharging.

Here, the first unit 200 is formed as an uppermost layer of the finally completed energy storage assembly 10, the third unit 200" is formed as a lowermost layer of the energy storage assembly 10, and the second unit 200' is formed as a plurality of intermediate layers disposed between the uppermost layer and the lowermost layer of the energy storage assembly 10.

Figure 11B:
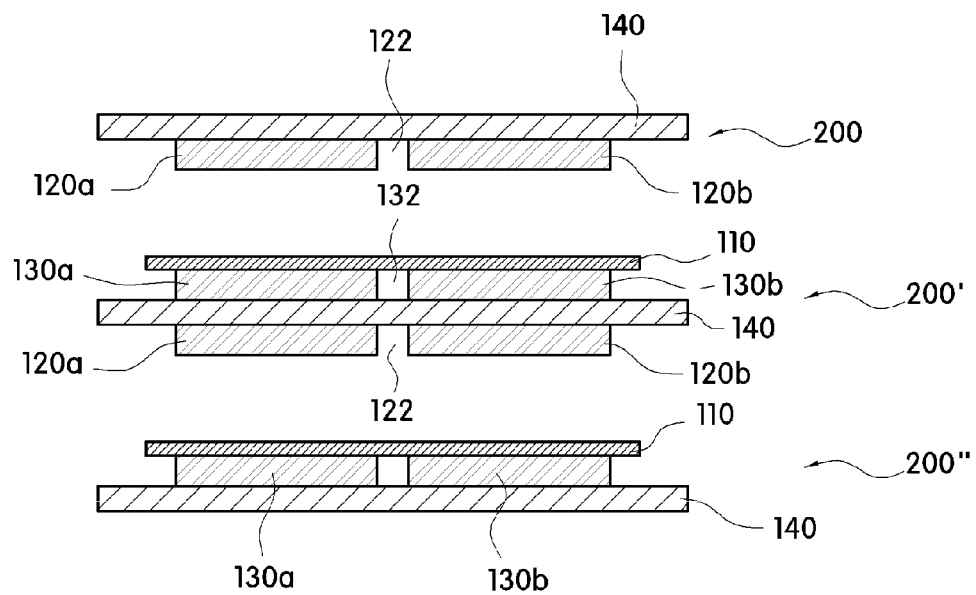

In this case, the current collectors 140, the active material layers 120 and 130, and the separation membrane 110 may be provided to have different sizes. In addition, the first active material layer 120 and the second active material layer 130 may be provided as the two pairs of plate members 120a and 120b and 130a and 130b having a predetermined area, respectively, as illustrated in FIG. 11B. The two pairs of plate members 120a and 120b and 130a and 130b may be provided between the separation membrane 110 and the current collector 140 to be spaced a predetermined distance from each other.

That is, the gaps 122 and 132 having a predetermined size are formed between the two pairs of plate members 120a and 120b and 130a and 130b along center lines of the separation membrane 110 or the current collector 140. The gaps 122 and 132 may serve as paths through which bubbles can move to improve discharge performance of bubbles even when bubbles are generated in a process of impregnating the active material layers 120 and 130 and the separation membrane 110 with an electrolytic solution after assembly of the energy storage assembly 10 is completed.

Since the roles of the gaps 122 and 132 are the same as those described above, detailed descriptions thereof will be omitted. In addition, in the following description, a general form in which the active material layers 120 and 130 are made with one plate member will be described.

Meanwhile, the separation membrane 110 may include the nonwoven fabric layer 112 and the nanofiber web layer 114 stacked on one surface or both surfaces of the nonwoven fabric layer 112, as illustrated in FIG. 3. Since this is the same content described above, a detailed description thereof will be omitted. Here, the separation membrane 110 is described as including the nonwoven fabric layer 112 and the nanofiber web layer 114 stacked on one surface or both of the surfaces of the nonwoven fabric layer 112, but the present disclosure is not limited thereto. It should be noted that a general separation membrane may be used.

In the forming of the plurality of partition assemblies 11, 12, and 13, the plurality of partition assemblies 11, 12, and 13 serve as an intermediate assembly for forming the final energy storage assembly 10. A process in which any one of a plurality of units 200' is disposed, the sealing member 20 is disposed to surround an edge of the current collector 140 provided in the disposed unit 200', and another one of the plurality of units 200' is then stacked thereon is repeatedly performed such that the individual partition assemblies 11, 12, and 13 are formed.

Each of the partition assemblies 11, 12, and 13 is formed as one partition assembly by stacking a predetermined number of the units 200, 200', and 200" and disposing a plurality of sealing members 20 which surround side portions of the plurality of units 200, 200', and 200", specifically, edges of the current collectors 140.

Figure 13A:
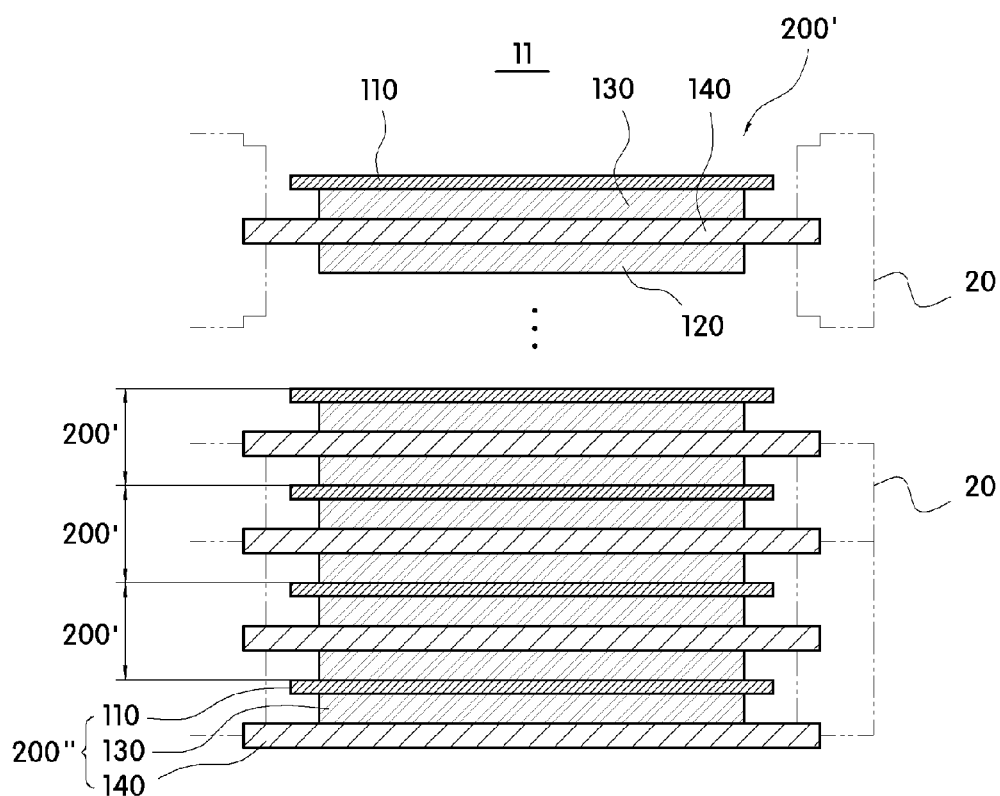
FIG. 13A is a cross-sectional view illustrating a first partition assembly.
Figure 13B:
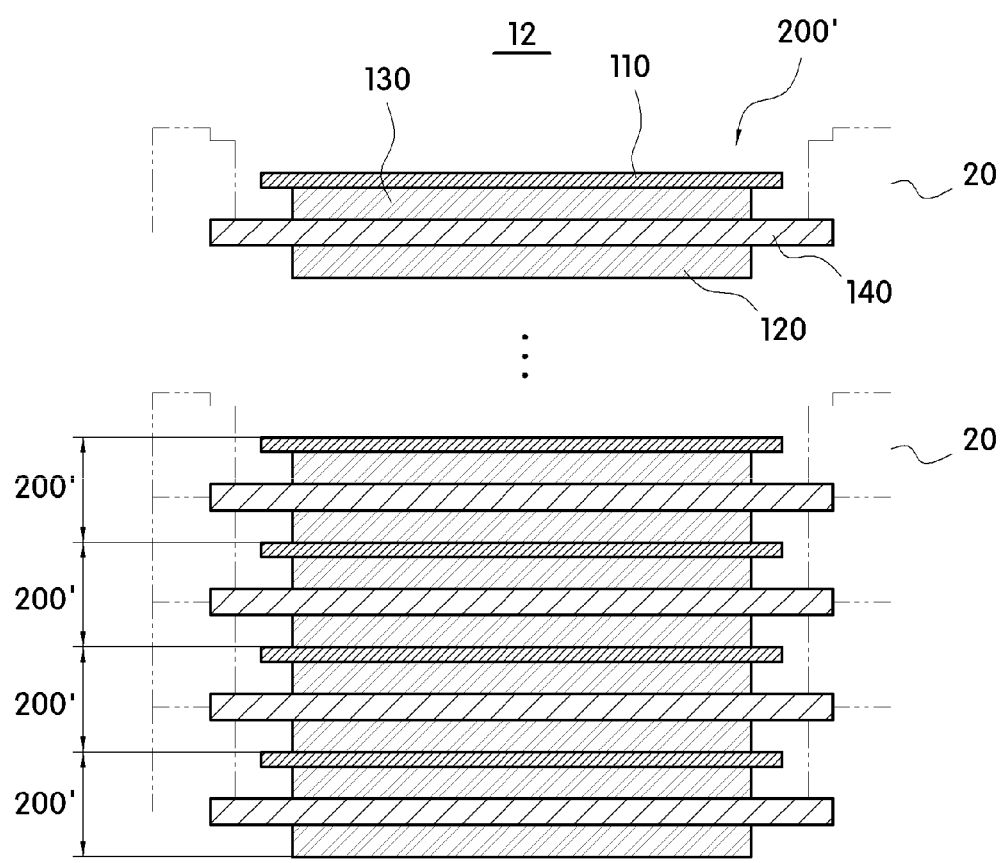
FIG. 13B is a cross-sectional view illustrating a second partition assembly.
Figure 13C:
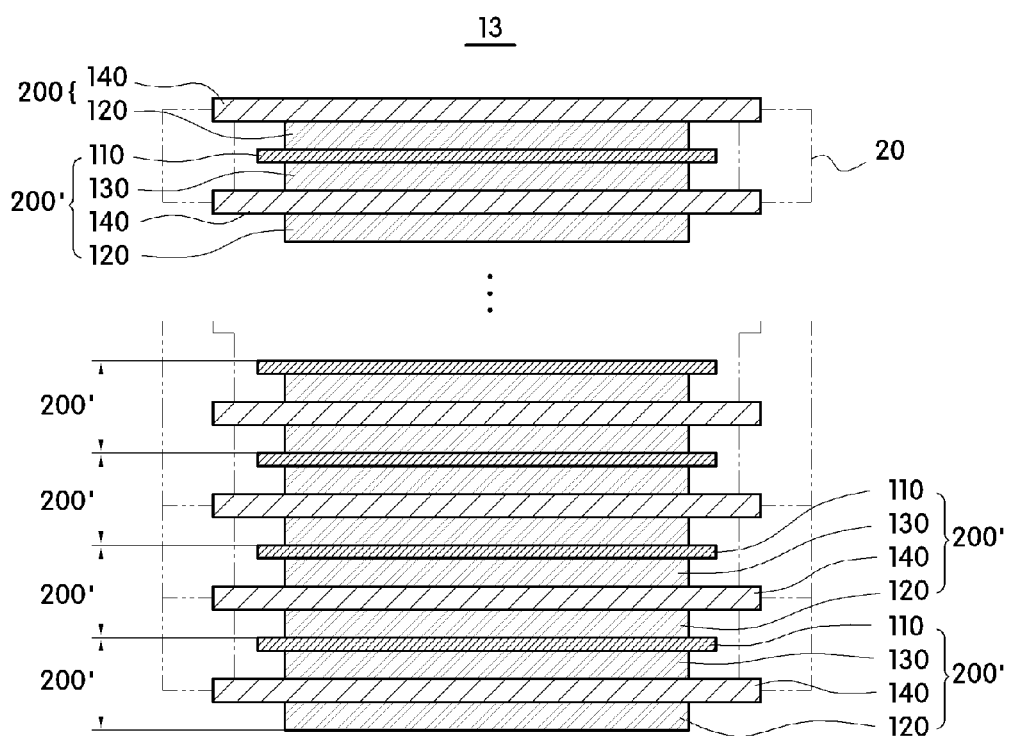
FIG. 13C is a cross-sectional view illustrating a third partition assembly.

The partition assemblies 11, 12, and 13 may include a first partition assembly 11 in which a predetermined number of second units 200' are sequentially stacked above the third unit 200", as illustrated in FIG. 13A, a second partition assembly 12 in which only the predetermined number second units 200' are sequentially stacked, as illustrated in FIG. 13B, and a third partition assembly 13 in which the predetermined number of second units 200' are sequentially stacked under the third unit 200", as illustrated in FIG. 13C.

Here, the first partition assembly 11 and the third partition assembly 13 are disposed on the uppermost portion and the lowermost portion of the energy storage assembly 10, respectively and the plurality of second partition assemblies 12 are stacked between the first partition assembly 11 and the third partition assembly 13. Then, the first partition assembly 11, the third partition assembly 13, and the plurality of second partition assemblies 12 are coupled to each other to complete the energy storage assembly 10.

That is, after one of the units 200, 200', and 200" is stacked on another of the units 200, 200', and 200", the units 200, 200', and 200" are sealed with the sealing member 20 disposed to surround the edge of the current collector 140 through a pressing process such that each of the partition assemblies 11, 12, and 13 is completed.

Here, the sealing member 20 is a member which is disposed to surround the side portions of the energy storage assembly 10, prevents leakage of the electrolytic solution, and prevents an electrical short circuit. The sealing member 20 is provided in a hollow shape and is disposed so that one side thereof comes into contact with the edge of the current collector 140 provided in each of the units 200, 200', and 200".

In this case, each of the sealing members 20 may be disposed so that an inner edge thereof protrudes by a predetermined length between a pair of current collectors 140 facing each other. Accordingly, in a pressing process for pressing two of the units 200, 200', and 200" stacked vertically, the sealing member 20 is disposed between the pair of current collectors 140, which are disposed upper and lower portions thereof, such that two of the units 200, 200', and 200" are integrated and the side portion of each of the units 200, 200', and 200" is sealed.

Meanwhile, in the case in which each of the partition assemblies 11, 12, and 13 is formed by stacking ten units 200, 200', and 200", the units 200, 200', and 200" come into close contact with each other through a total of nine pressing processes such that one partition assembly 11, 12, or 13 is formed.

Here, each of the partition assemblies 11, 12, and 13 is formed by using a fixed frame 80 including a base plate 81 and a plurality of support rods 82 which extend upward by a predetermined length from an edge of the base plate 81. The support rods 82 are disposed in the same number and at the same positions as the coupling beams 50 installed to pass through the sealing member 20 in a final finished product.

Figure 14A:
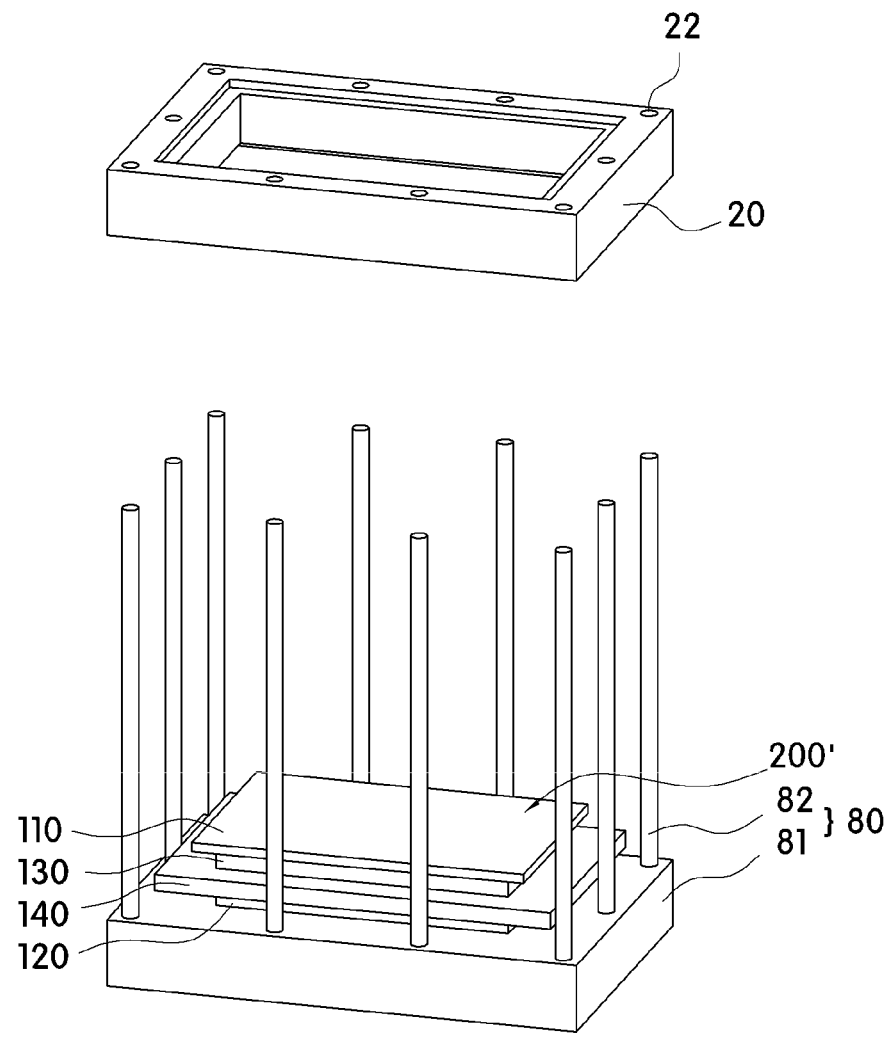
FIG. 14A is a view illustrating a state in which a second unit is stacked on a fixed frame.

Referring to FIGS. 14A to 14D, a procedure of manufacturing the second partition assembly 12 is as follows. First, as illustrated in FIG. 14A, one second unit 200' is disposed on an upper surface of the base plate 81, and a sealing member 20 is then disposed to surround an edge of the current collector 140 of the second unit 200'. In this case, the support rods 82 are inserted into the plurality of fastening holes 22 formed to pass therethrough in the height direction in an edge of the sealing member 20.

Figure 14B:
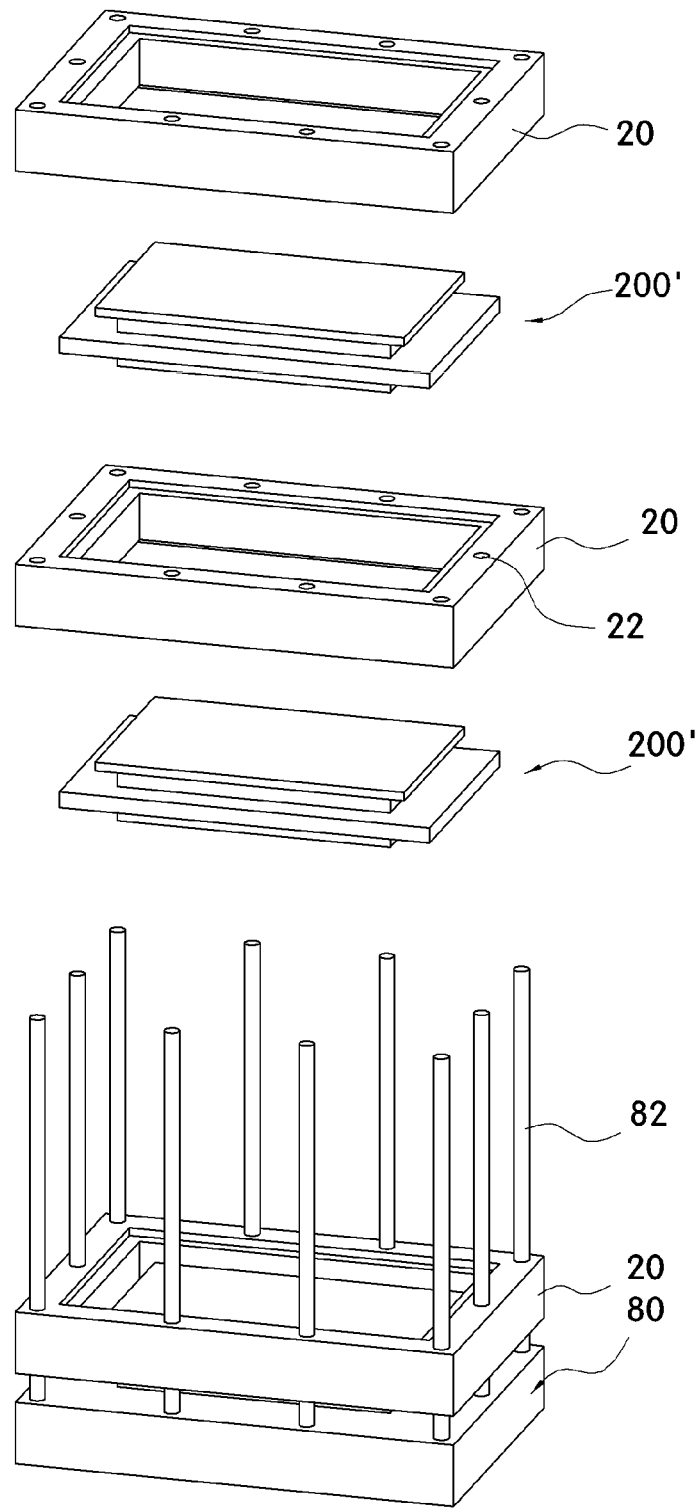
FIG. 14B is a view illustrating a stacking sequence of the second unit and a sealing member.

Next, as illustrated in FIG. 14B, another second unit 200' is stacked thereon, and the other sealing member 20 is disposed to surround an edge of the current collector 140 provided in still another second unit 200'. Then, the two second units 200' are pressed through a pressing process such that the two second units 200' and the sealing member 20 may come into close contact with each other.

Figure 14C:
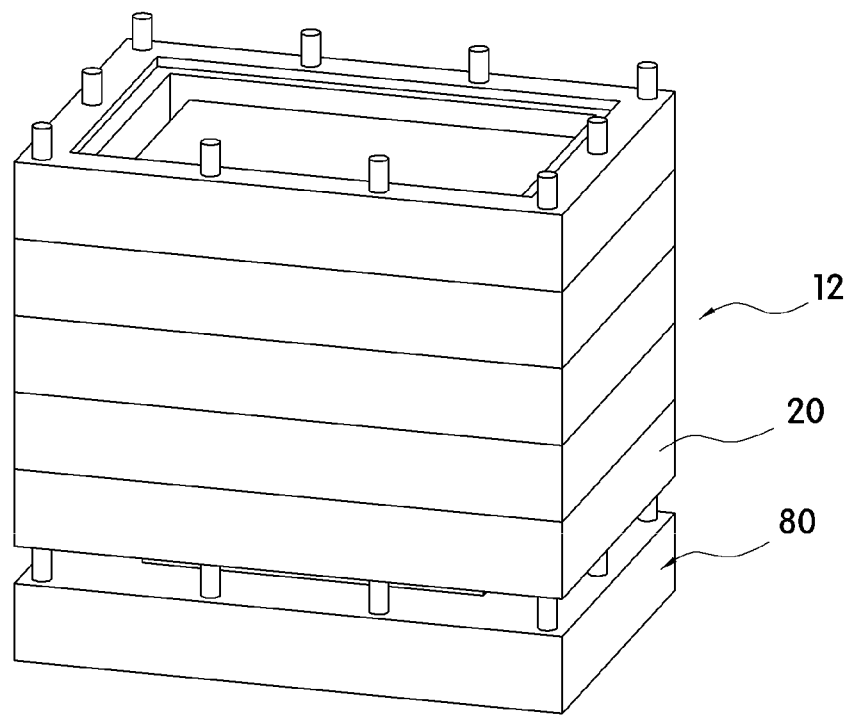
FIG. 14C is a view illustrating a state in which all second units used in the second partition assembly are stacked.
Figure 14D:
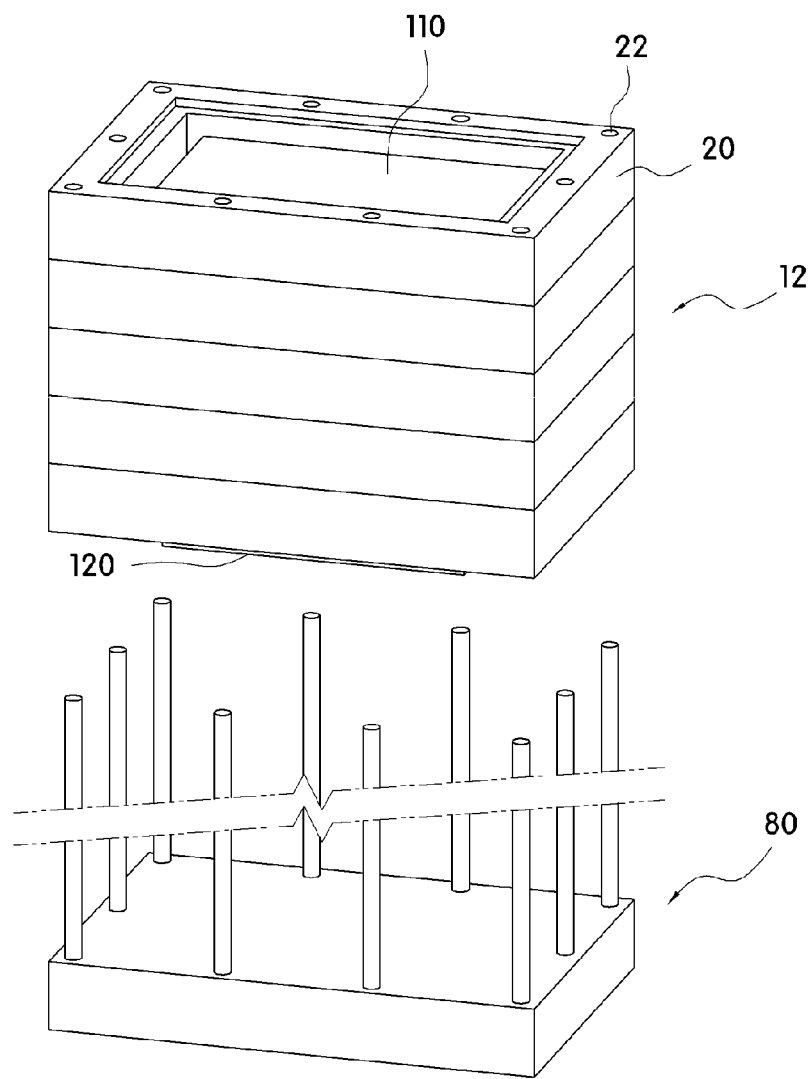
FIG. 14D is a view illustrating a state in which the fixed frame is separated from the second units of FIG. 5C.

By repeating the above process, a predetermined number of second units 200' are stacked and come into close contact with each other by applying a close contact load during each stacking, and the predetermined number of second units 200' and the sealing member 20 are sequentially stacked and integrated (see FIG. 14C). Then, when the fixed frame 80 disposed at the lowermost portion is removed, the second partition assembly 12 is completed (see FIG. 14D).

Here, the first partition assembly 11 and the third partition assembly 13 are also formed through the same operations as those described in FIGS. 14A to 14D. However, since the other parts are the same except that only the third unit 200" in the first partition assembly 11 is disposed at the lowermost layer in comparison to the second partition assembly 12 and the first unit 200 in the third partition assembly 13 is disposed at the uppermost layer in comparison to the second partition assembly 12, detailed descriptions thereof will be omitted.

In the super capacitor according to the present disclosure, the energy storage assembly 10 may be divided into the plurality of partition assemblies 11, 12, and 13, and the plurality of partition assemblies 11, 12, and 13 may be stacked one time and finally brought into close contact with each other to form the energy storage assembly 10 such that the number of pressing processes to be performed on the units 200 and 200' disposed at the lowermost layer by the repetitive pressing process may be significantly reduced.

When completing the energy storage assembly 10, as illustrated in FIGS. 15A to 15D, the plurality of partition assemblies 11, 12, and 13 formed by stacking the predetermined number of plurality of units 200, 200', and 200" are sequentially disposed between the upper plate 30a and the lower plate 30b, and the plurality of partition assemblies 11, 12, and 13 and the upper and lower plates 30a and 30b are integrated via the coupling beams 50 such that the super capacitor 1, which is a final finished product, is completed.

Figure 15A:
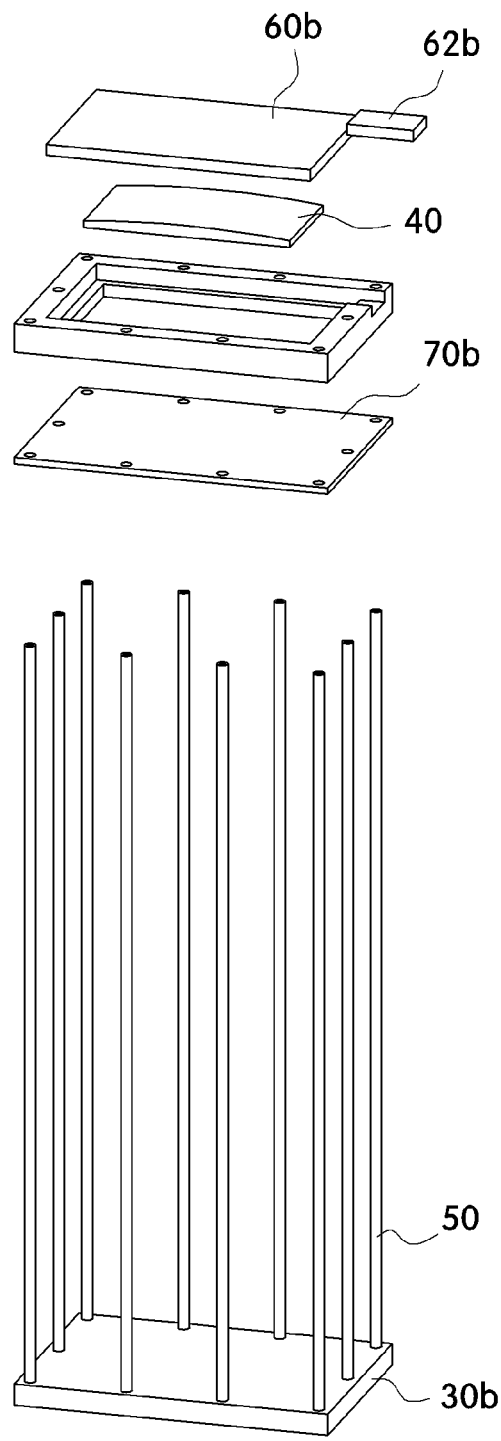
FIG. 15A is a view illustrating a sequence in which an insulating layer, a roll force compensation member, and an electrode plate are stacked on a lower plate.
Figure 15B:
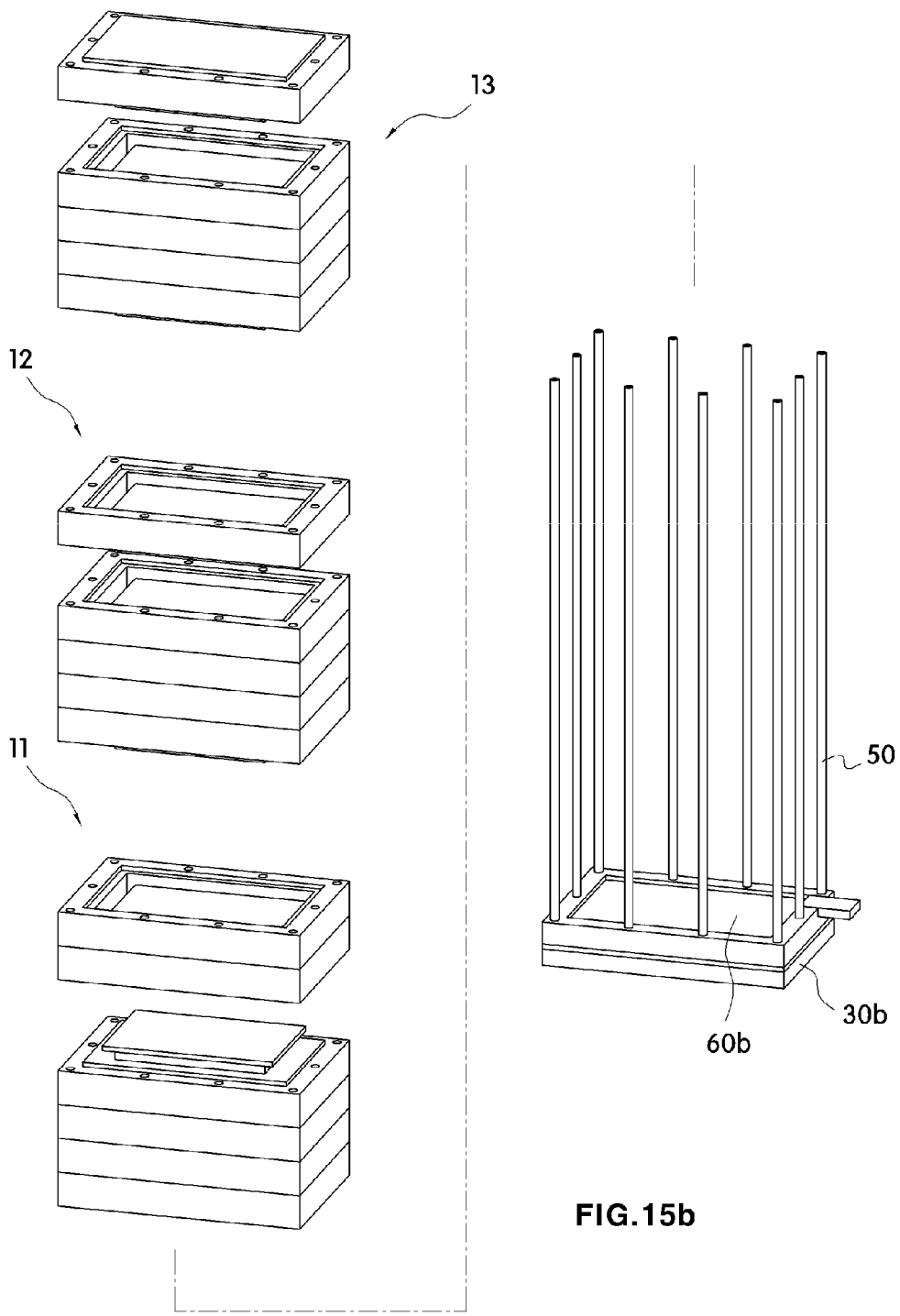
FIG. 15B is a view illustrating a sequence in which a first partition assembly, a second partition assembly, and a third partition assembly are stacked thereon.

Here, the first partition assembly 11 is stacked on the lower plate 30b, the plurality of second partition assemblies 12 are stacked on the first partition assembly 11, the third partition assembly 13 is stacked on the second partition assembly 12, which is stacked on an uppermost portion, and the upper plate 30a is then stacked on the third partition assembly 13 (see FIG. 15B).

Figure 16:
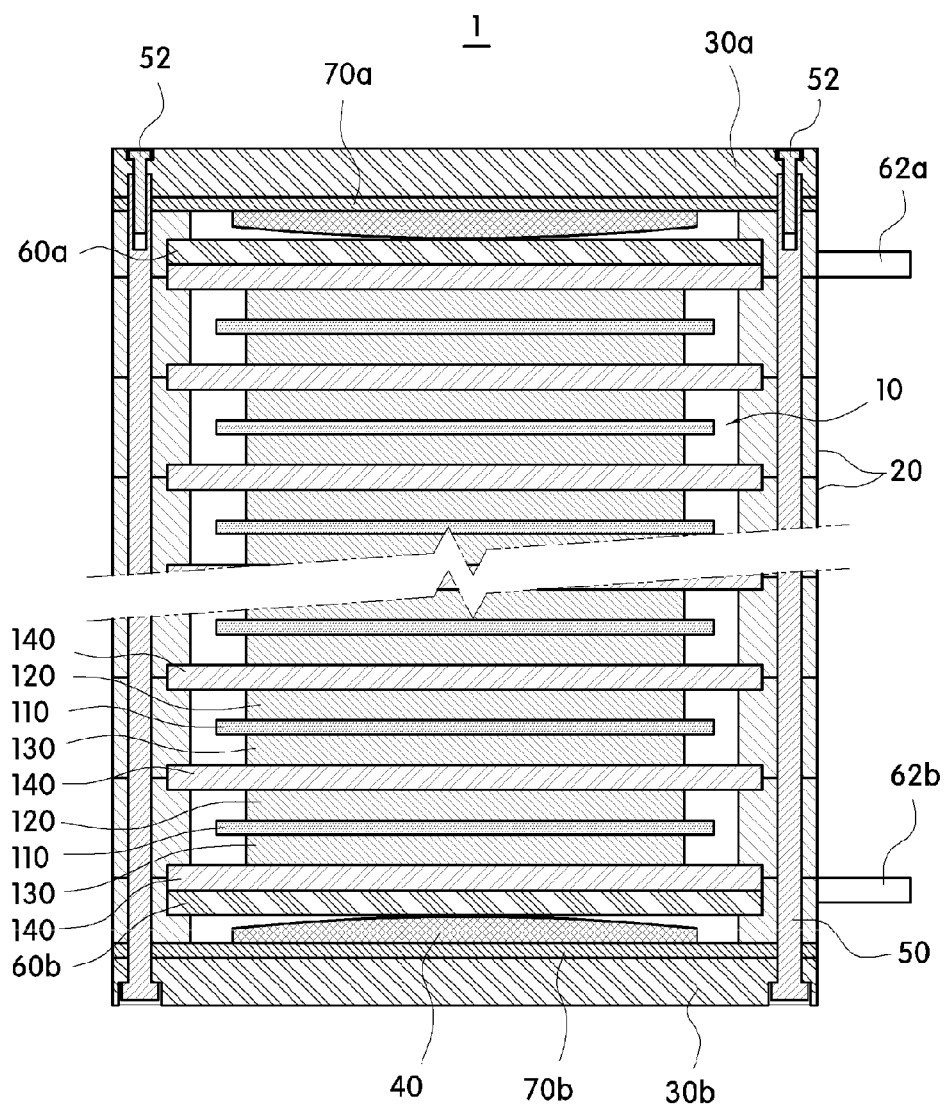
FIG. 16 is a cross-sectional view of a super capacitor manufactured by a method of manufacturing a super capacitor according to one embodiment of the present disclosure.

Accordingly, the energy storage assembly 10 is implemented in the form in which the current collector 140, the first active material layer 120, the separation membrane 110, the second active material layer 130, the current collector 140, the first active material layer 120, the separation membrane 110, the second active material layer 130, and the current collector 140 are sequentially stacked (see FIG. 16).

In the super capacitor 1 according to the present disclosure, all of the units 200, 200', and 200" which are used in the process of forming one energy storage assembly 10 by stacking several tens to hundreds of units are divided by a predetermined number to form each of the partition assemblies 11, 12, and 13, and the plurality of partition assemblies 11, 12, and 13 are finally stacked such that one energy storage assembly 10 is formed.

Therefore, even when a pressing process for pressing each of the units 200, 200', and 200" is repeatedly performed in the process of stacking each of the units 200, 200', and 200", the number of times the pressing process, which is applied to each of the units 200 and 200' disposed at the lowermost portion of one of the partition assemblies 11, 12, and 13, is performed is limited not to exceed a predetermined number of times.

Accordingly, all of the plurality of units 200, 200', and 200" required for forming one energy storage assembly are sequentially stacked from the lower plate 30b and each of the partition assemblies 11, 12, and 13 is formed as an intermediate process in comparison to a conventional process in which the energy storage assembly is completed by performing a pressing process each time each of the units 200, 200', and 200" are stacked or each of the members is stacked such that the total number of times the pressing process, which is applied to each of the units 200 and 200' disposed at the lowermost portion, is performed may be divided. Therefore, there is an advantage in that the total number of times the pressing process, which is applied to each of the units 200 and 200' disposed at the lowermost portion of the energy storage assembly 10, is performed and an amount of accumulation of the roll force may be significantly reduced.

Meanwhile, the plurality of coupling beams 50 each having one end fixed to one of the upper plate 30a and the lower plate 30b are disposed to spaced apart from each other along an edge thereof (see FIG. 15A).

Hereinafter, description will proceed under the assumption that lower ends of the coupling beams 50 are fixed to the lower plate 30b and upper ends of the coupling beams 50 pass through the upper plate 30a to be fastened to fixing nuts 52 for convenience of description.

Here, the coupling beams 50 may be formed with a material such as a ceramic material, an insulating metal, a polymer having chemical resistance, or the like. The lower ends of the coupling beams 50 are fixed to the lower plate 30b and the upper ends are fixed to the upper plate 30a by passing through the fastening holes 22 provided in the sealing member 20.

Therefore, the plurality of partition assemblies 11, 12, and 13 are integrated via the coupling beams 50 to form the energy storage assembly 10, and the energy storage assembly 10 and the upper and lower plates 30a and 30b are integrated via the coupling beams 50 to serve as a case for accommodating the energy storage assembly 10.

Here, the upper plate 30a comes into close contact with an upper surface in which a positive electrode of the energy storage assembly 10 is disposed at an outermost periphery, and the lower plate 30b comes into close contact with a lower surface in which a negative electrode of the energy storage assembly 10 is disposed at an outermost periphery. Conversely, the positive electrode of the energy storage assembly 10 may be disposed to come into contact with the lower plate 30b while the negative electrode of the energy storage assembly 10 may be disposed to come into contact with the upper 30a.

In this case, the upper and lower plates 30a and 30b disposed on the upper and lower portions of the energy storage assembly 10 are provided to have the same area as or a greater area than that of the sum of areas of the sealing member 20 and the current collectors 140 so that the upper and lower plates 30a and 30b may press the sealing members 20 disposed on the side portion of the energy storage assembly 10 when fixed via the coupling beams 50. Accordingly, even when a plurality of sealing members 20 are provided and stacked in the vertical direction, leakage of the electrolytic solution through connected portions may be prevented by being pressed by the upper and lower plates 30a and 30b.

Figure 15C:
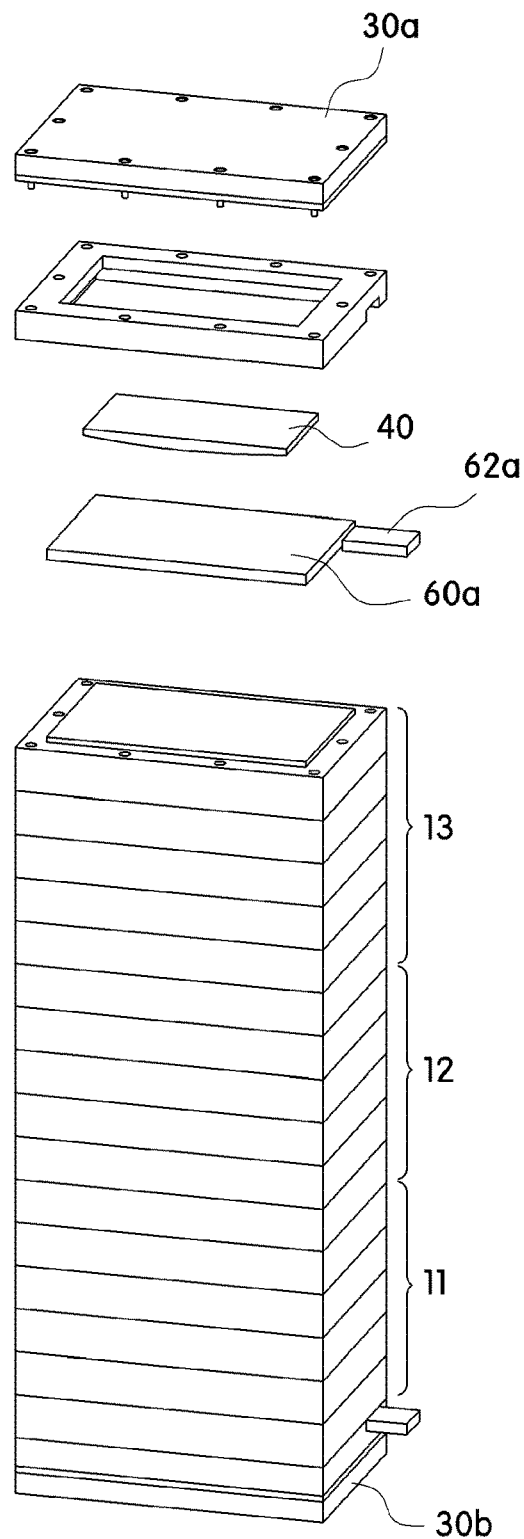
FIG. 15C is a view illustrating a sequence in which an electrode plate, a roll force compensation member, an insulating layer, and an upper plate are stacked thereon.

Meanwhile, the disposing of the pair of corresponding electrode plates 60a and 60b between an uppermost surface of the energy storage assembly 10 and the upper plate 30a and between a lowermost surface of the energy storage assembly 10 and the lower plate 30b, respectively, is performed (see FIGS. 15A and 15C). Portions of the pair of electrode plates 60a and 60b protrude outward from the electrode plates 60a and 60b to be exposed to the outside of the sealing members 20 disposed on the side portions of the energy storage assembly 10 to be implemented as the protruding terminals 62a and 62b. Here, one of the pair of electrode plates 60a and 60b serves as a negative electrode terminal and the other one serves as a positive electrode terminal.

In this case, the method of manufacturing a super capacitor may include disposing the insulating layers 70a and 70b for preventing an electrical short circuit between the electrode plates 60a and 60b and the upper and lower plates 30a and 30b (see FIGS. 15A and 15C). Here, the insulating layers 70a and 70b may be made with the same material as the sealing members 20 disposed on the side portions of the energy storage assembly 10 to prevent an electrical short circuit, and may prevent leakage of the electrolytic solution through gaps between the electrode plates 60a and 60b and the upper and lower plates 30a and 30b.

Also, the method of manufacturing a super capacitor may include disposing the roll force compensation members 40 for preventing convex bending of the center portion of the energy storage assembly 10 bent toward the upper and lower plates 30a and 30b between the upper and lower plates 30a and 30b and the energy storage assembly 10.

The roll force compensation members 40 are disposed in central regions of the upper and lower plates to prevent deformation of the energy storage assembly 10 caused by a difference between roll forces according to position.

In this case, the roll force compensation members 40 may be disposed on central regions including center points of the upper and lower plates 30a and 30b, and may be disposed between the insulating layers 70 and the electrode plates 60a and 60b. In addition, the roll force compensation members 40 may be provided to have a smaller sectional area than that of each of the active material layers 120 and 130 provided in the energy storage assembly 10 so that damage to edge sides of the active material layers 120 and 130 due to an increase of a roll force provided through the roll force compensation members 40 may be prevented. Here, since the roll force compensation member 40 is the same as the above-described roll force compensation member, a detailed description thereof will be omitted.

Figure 15D:
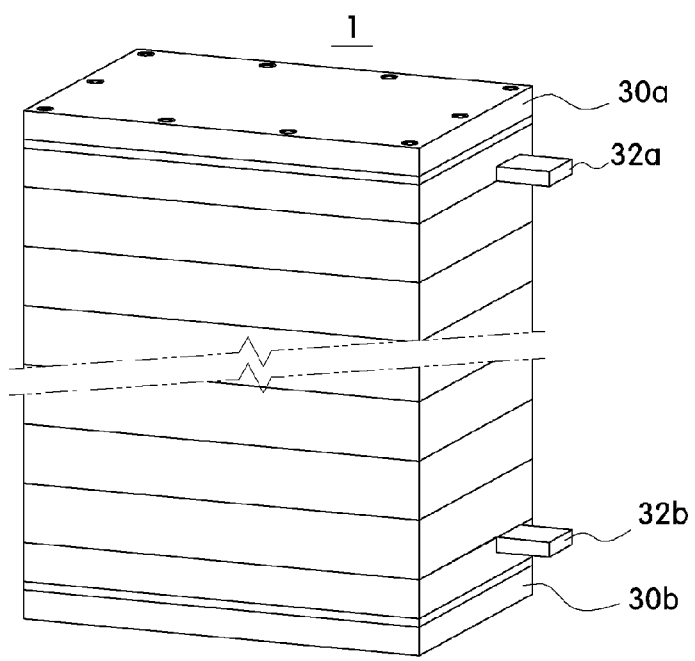
FIG. 15D is a view illustrating an exterior in a state in which an assembly of the super capacitor is completed.

As described above, when the electrode plates 60a and 60b, the roll force compensation members 40, and the insulating layers 70a and 70b are disposed between the upper plate 30a or the lower plate 30a and the energy storage assembly 10, in a state in which the insulating layer 70b, the roll force compensation member 40, and the electrode plates 60b are sequentially stacked on the upper portion of the lower plate 30b (see FIG. 15A), the first partition assembly 11, the second partition assembly 12, and the third partition assembly 13 are sequentially stacked thereon again (see FIG. 15B), the electrode plate 60a, the roll force compensation member 40, and the insulating layer 70a are sequentially stacked again on the upper portion of the third partition assembly 13, the upper plate 30a is disposed thereon (see FIG. 15C), and the final assembly is then completed (see FIG. 15D).

Here, when the active material layers 120 and 130 are made with the two members and are disposed on both surfaces of the separation membrane 110 to be spaced apart from each other, the finally completed super capacitor is in the form of FIGS. 5 and 6.

While the embodiments of the present disclosure have been described above, the spirit of the present disclosure is not limited to the embodiments set forth herein, and those skilled in the art who understand the spirit of the present disclosure may easily purpose other embodiments by adding, changing, deleting, etc. elements within the same scope, and such embodiments will also be within the scope of the present disclosure.

The invention claimed is:

1. A super capacitor comprising:
an energy storage assembly in which a plurality of unit modules are stacked;
a sealing member disposed to surround a side portion of the energy storage assembly;
upper and lower plates disposed on upper and lower portions of the energy storage assembly, respectively; and
a roll force compensation member disposed between each of the upper and lower plates and the energy storage assembly and configured to prevent convex bending of a center portion of the energy storage assembly toward the upper and lower plates;
wherein the roll force compensation member is disposed on a central region of each of the upper and lower plates and is provided to have a smaller area than a sectional area of an active material layer provided in the energy storage assembly.

2. The super capacitor of claim 1, wherein a pair of corresponding electrode plates are disposed between an uppermost surface of the energy storage assembly and the upper plate and between a lowermost surface of the energy storage assembly and the lower plate, respectively.

3. The super capacitor of claim 2, wherein the pair of electrode plates include protruding terminals each configured to extend outwardly from the electrode plates to be exposed to an outside of the sealing member.

4. The super capacitor of claim 2, wherein insulating layers are disposed between the electrode plates and the upper and lower plates, and the roll force compensation member is disposed between each of the insulating layers and each of the electrode plates.

5. The super capacitor of claim 1, wherein the roll force compensation member is provided to have a circular cross section, a polygonal cross section including a rectangular cross section, or a combination of cross sections.

6. A super capacitor comprising:
an energy storage assembly in which a plurality of unit modules are stacked;
a sealing member disposed to surround a side portion of the energy storage assembly;
upper and lower plates disposed on upper and lower portions of the energy storage assembly, respectively; and
a roll force compensation member disposed between each of the upper and lower plates and the energy storage assembly and configured to prevent convex bending of a center portion of the energy storage assembly toward the upper and lower plates,
wherein the roll force compensation member is provided to have a reduced height toward an outer portion thereof with respect to a center point thereof.

7. A super capacitor comprising:
an energy storage assembly in which a plurality of unit modules are stacked;
a sealing member disposed to surround a side portion of the energy storage assembly;
upper and lower plates disposed on upper and lower portions of the energy storage assembly, respectively; and
a roll force compensation member disposed between each of the upper and lower plates and the energy storage assembly and configured to prevent convex bending of a center portion of the energy storage assembly toward the upper and lower plates,
wherein each of the unit modules includes:
a separation membrane;
an active material layer including a first active material layer stacked on one surface of the separation membrane and a second active material layer stacked on the other surface of the separation membrane; and
a pair of current collectors stacked on one side of the first active material layer and one side of the second active material layer, respectively,
wherein the first active material layer and the second active material layer are formed with two members, and the two members are spaced a predetermined distance from each other to form paths through which bubbles are discharged.

8. The super capacitor of claim 7, wherein the path formed in the first active material layer and the path formed in the second active material layer are provided to have different directions.

9. The super capacitor of claim 7, wherein the sealing member is provided in a hollow shape to surround the current collectors, and a plurality of sealing members are stacked in a vertical direction and integrated via one coupling beam.

10. The super capacitor of claim 9, wherein a plurality of coupling beams are provided along an edge of the sealing member, lower ends of the coupling beams are fixed to the lower plate, and upper ends thereof are fixed to the upper plate.

11. The super capacitor of claim 7, wherein the separation membrane is provided to have a larger size than that of the active material layer, and the current collectors are provided to have a larger size than that of the separation membrane.

12. A super capacitor comprising:
an energy storage assembly in which a plurality of unit modules are stacked;
a sealing member disposed to surround a side portion of the energy storage assembly;
upper and lower plates disposed on upper and lower portions of the energy storage assembly, respectively; and
a roll force compensation member disposed between each of the upper and lower plates and the energy storage assembly and configured to prevent convex bending of a center portion of the energy storage assembly toward the upper and lower plates,
wherein each of the unit modules includes:
a separation membrane;
an active material layer including a first active material layer stacked on one surface of the separation membrane and a second active material layer stacked on the other surface of the separation membrane; and
a pair of current collectors stacked on one side of the first active material layer and one side of the second active material layer, respectively,
wherein the separation membrane includes a nonwoven fabric layer and a nanofiber web layer containing a polyacrylonitrile nanofiber stacked on one surface or both surfaces of the nonwoven fabric layer;
wherein an average thickness of the nonwoven fabric layer ranges from 10 to 30 μm, and an average thickness of the nanofiber web layer ranges from 1 to 5μm.

13. The super capacitor of claim 12, wherein the nanofiber web layer is formed with only the polyacrylonitrile nanofiber.

14. The super capacitor of claim 12, wherein an average diameter of the polyacrylonitrile nanofiber ranges from 0.1 μm to 2μm.

15. The super capacitor of claim 12, wherein the nonwoven fabric layer is formed with one nonwoven fabric selected from a group consisting of cellulose, cellulose acetate, polyvinyl alcohol, polysulfone, polyimide, polyetherimide, polyamide, polyethylene oxide, polyethylene, polypropylene, polyethylene terephthalate, polyurethane, poly methylmethacrylate, and polyacrylonitrile.

16. A super capacitor comprising:
an energy storage assembly in which a plurality of unit modules are stacked;
a sealing member disposed to surround a side portion of the energy storage assembly;
upper and lower plates disposed on upper and lower portions of the energy storage assembly, respectively; and
a roll force compensation member disposed between each of the upper and lower plates and the energy storage assembly and configured to prevent convex bending of a center portion of the energy storage assembly toward the upper and lower plates,
wherein each of the unit modules includes:
a separation membrane;
an active material layer including a first active material layer stacked on one surface of the separation membrane and a second active material layer stacked on the other surface of the separation membrane; and
a pair of current collectors stacked on one side of the first active material layer and one side of the second active material layer, respectively,
wherein the separation membrane includes a nonwoven fabric layer and a nanofiber web layer containing a polyacrylonitrile nanofiber stacked on one surface or both surfaces of the nonwoven fabric layer,
wherein the nonwoven fabric layer further includes an inorganic additive agent, and the inorganic additive agent includes at least one selected from a group consisting of $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SiO_2$, $Al_2O_3$, and polytetrafluoroethylene (PTFE).

* * * * *